(12) United States Patent
Lowman

(10) Patent No.: US 6,763,635 B1
(45) Date of Patent: Jul. 20, 2004

(54) BOOM WITH MAST ASSEMBLY

(75) Inventor: Eric E. Lowman, Cibolo, TX (US)

(73) Assignee: Shook Mobile Technology, LP, San Antonio, TX (US)

( * ) Notice: Subject to any disclaimer, the term of this patent is extended or adjusted under 35 U.S.C. 154(b) by 0 days.

(21) Appl. No.: 09/451,830

(22) Filed: Nov. 30, 1999

(51) Int. Cl.[7] .................... G01N 23/04; B66C 23/18; B66C 23/62; E04C 3/00
(52) U.S. Cl. .................. 52/114; 52/111; 52/223.9; 52/726.2; 52/731.2; 52/732.1; 378/57; 378/198
(58) Field of Search ............................ 52/730.1, 731.1, 52/731.2, 732.1, 726.2, 223.8, 223.9, 111, 114, 117, 118, 650.1; 378/57, 193, 197, 198

(56) References Cited

U.S. PATENT DOCUMENTS

| | | | |
|---|---|---|---|
| 2,728,463 A | | 12/1955 | Beckwith |
| 3,063,523 A | * | 11/1962 | Triplett |
| 3,423,890 A | * | 1/1969 | Leigh |
| 3,826,324 A | | 7/1974 | Stevens |
| 3,858,374 A | * | 1/1975 | Ben-Zvi |
| 3,902,070 A | | 8/1975 | Amor, Jr. et al. |
| 4,494,351 A | * | 1/1985 | Thomasson |
| 4,676,330 A | | 6/1987 | Roberts |
| 4,910,940 A | * | 3/1990 | Grady |
| 5,152,659 A | | 10/1992 | Waka |
| 5,343,970 A | | 9/1994 | Serverinsky |
| 5,516,069 A | | 5/1996 | Hanna |
| 5,547,148 A | | 8/1996 | Del Monte et al. |
| 5,553,927 A | | 9/1996 | Mastrangelo |
| 5,568,829 A | | 10/1996 | Crawford et al. |
| 5,678,610 A | | 10/1997 | Scarazzo et al. |
| 5,692,028 A | | 11/1997 | Geus et al. |
| 5,751,081 A | | 5/1998 | Morikawa |
| 5,764,683 A | | 6/1998 | Swift et al. |
| 5,823,578 A | | 10/1998 | Chiou |
| 5,845,732 A | | 12/1998 | Taniguchi et al. |
| 5,890,555 A | | 4/1999 | Miller |
| 5,903,623 A | | 5/1999 | Swift et al. |

FOREIGN PATENT DOCUMENTS

GB        2 054 366 A    *    2/1981    ........... A47B/47/00

OTHER PUBLICATIONS

Brochure from American Science and Engineering, Inc.
Article entitled "Mobile X–ray Inspection Systems".
Article entitled "HI–CO–SCAN—Silhouette Scan".

* cited by examiner

Primary Examiner—Robert Canfield
(74) Attorney, Agent, or Firm—Akin Gump Strauss Hauer & Feld, LLP

(57) ABSTRACT

A torsion- and bending resistant boom formed of beams running the length of the structure, a set of pierced, transverse flanges arrayed along, and substantially perpendicular to, the length of the structure, a continuous longitudinal member running the length of the structure, piercing the flanges, and several further longitudinal members, outward of the first member. The longitudinal members are welded to the flanges. An elevatable mast assembly raises and lowers the boom, and has a mast and guides formed of hollow tubes, and rollers between the guides and the mast, the rollers transferring torque loading to the guides.

35 Claims, 21 Drawing Sheets

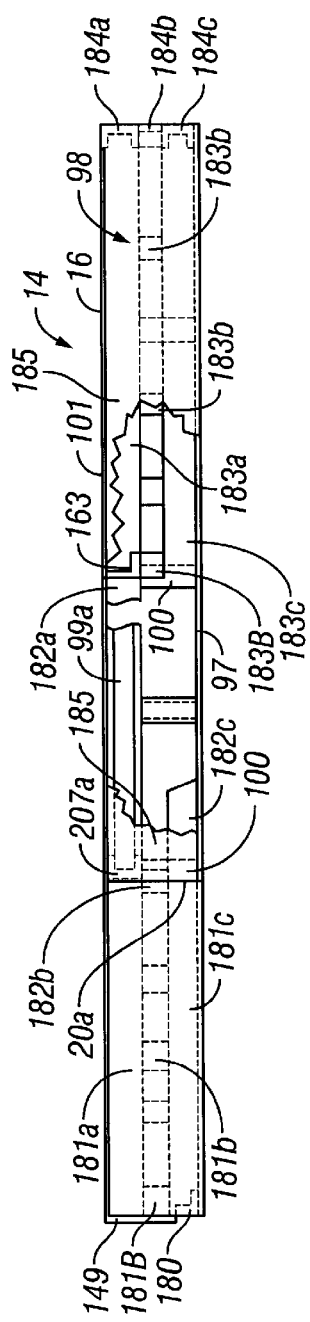
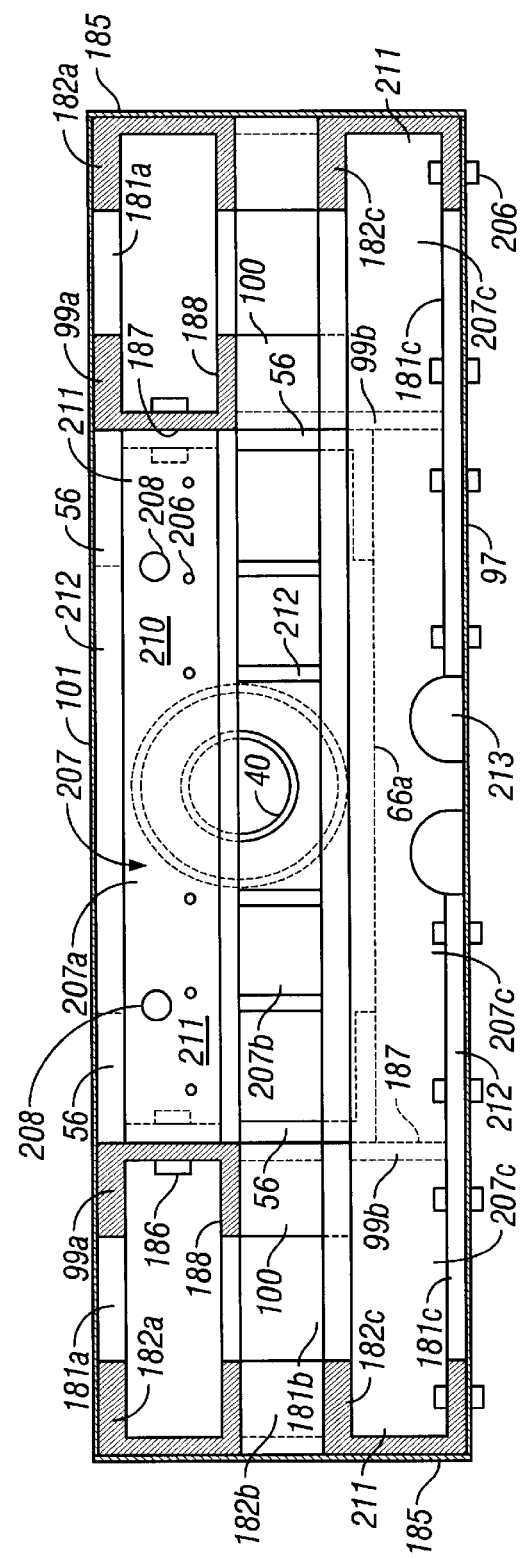
FIG. 6C
FIG. 6D

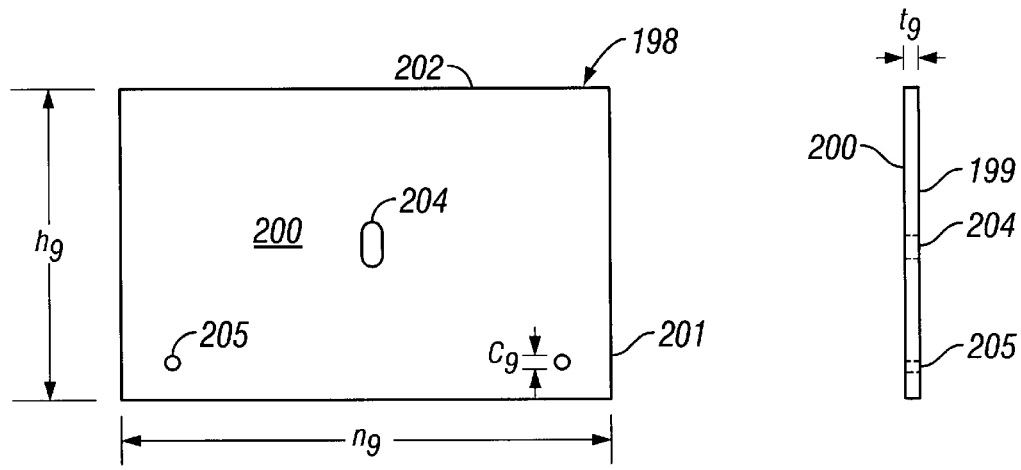
FIG. 13A  FIG. 13B
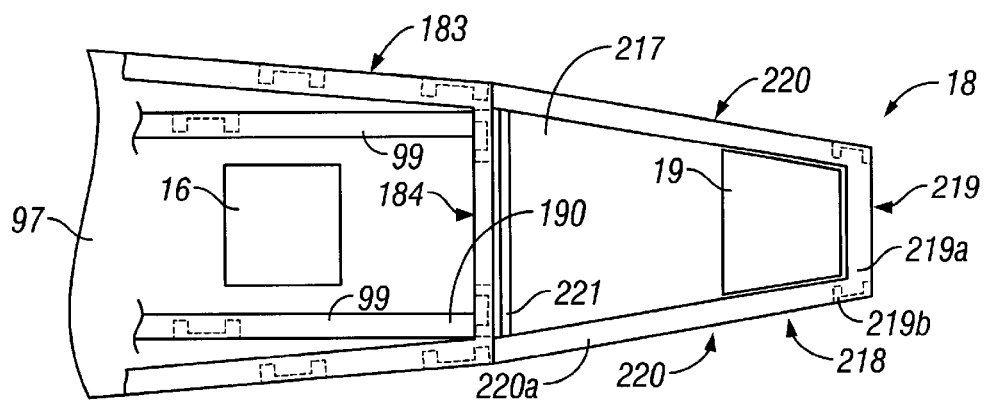
FIG. 14A
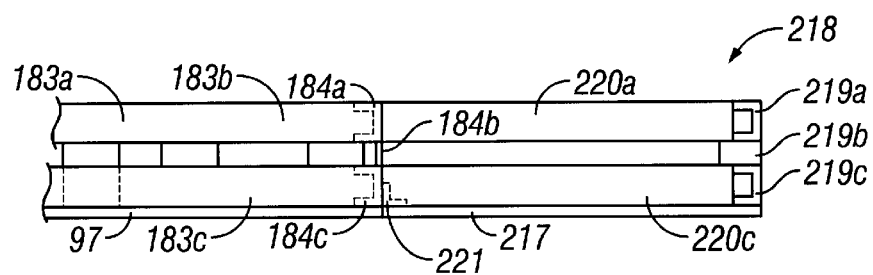
FIG. 14B

BOOM WITH MAST ASSEMBLY

BACKGROUND OF THE INVENTION

1. Field of the Invention

The present invention relates to booms and mast structures for supporting a load, and to those supporting torque-inducing loads. In particular, if relates to a boom structure that may be rotated, and a mast structure that may be elevated. More particularly, it relates to a boom and mast structure mounted on a mobile platform for deployment of a system for inspection of vehicles or containers.

A boom used to support a load at a distance from a vertical support must resist deformation resulting from the downward forces applied thereto by that load, and the torque created thereby. In addition, where that boom and load may be subject to acceleration resulting from translation or rotation, or other application of forces, in other than the vertical direction, the boom must also resist torsion along its long axis. The necessity of resisting torsion will be increased by a further load in the form of a vertical portion extending downwardly from its far end, which acts to intensify torsional effects created by movement out of the vertical.

A mobile transport may have a mast mounted thereon, and a boom mounted atop the mast, which is rotatable with respect to the mast, and which has a vertical portion supported by its far end. For use in inspection of vehicles or containers, the mobile transport may mount a transmitter and sensors, on the boom and the vertical portion, for inspecting vehicles or containers which pass below and inward of the boom as the mobile transport is propelled past those items. In this situation, in order to increase the accuracy of the inspection, it is particularly important to resist torsion and bending to minimize changes in the position of the boom relative to the transport. Further, where the mast is to be raised of lowered along a vertical axis, the system used to do so must also guide that movement, and resist torque created by the load of the boom and its load.

2. Background Art

A structure supporting a load at a distance is subject to both bending and torsional effects, particularly when a further perpendicular structure is supported at a distance from the point of support. The use of metal tubes or beams for constructing such structures is known, as is use of C-channel beams to resist torsion or bending. However, such structures, if relatively long, are subject to buckling if not reinforced, and may not be sufficient to resist higher bending and torsion loads. Construction, and reinforcement of, such a structure installed upon a mobile platform must also address weight concerns related to vehicle weight and stability. Further, such structures must also resist movement of the structure relative to the point of support. Previous devices disclosed in patents include the following:

U.S. Pat. No. 5,152,659 to Waka discloses a boom assembly having an inflection point therein that utilizes two opposing upper and lower welded C-channels to form a box structure. The booms are used to form the arms supporting the bucket of a bulldozer. Waka does not address the use of tubes, or other reinforcements.

U.S. Pat. No. 5,568,829 to Crawford et al. discloses a boom for a sliding boom delimber, for use in the logging industry, the boom utilizing a pre-stressed I-beam to enclose and support power and control cables to the delimbing apparatus attached at its end. Crawford et al. do not address the use of tubes, or other reinforcements.

U.S. Pat. No. 5,692,028 to Geus et al. discloses a x-ray examining apparatus mounted on a mobile vehicle, including a support structure and detectors mounted on the supporting structure. Geus et al. do not address construction of any boom, mast or other structure supporting the detectors, or how to minimize movement of the support structure relative to the vehicle.

U.S. Pat. Nos. 5,764,683 and 5,903,623 to Swift et al. disclose a mobile device for inspection of containers, including detectors that may be supported from a horizontal boom extending from the mobile device. Swift et al. do not address construction of a boom or mast supporting the detectors, or how to minimize movement of the boom relative to the mobile device.

In addition, a mast assembly is known for raising and lowering a load from a mobile platform; such structures often utilize a mast formed of a hydraulic piston. A lateral load, such as that resulting from torque applied by a boom in the present invention, may be applied. In the absence of a separate guiding system, lateral loading would be transmitted through the hydraulic seals (often O-rings) to the cylinder walls, which may unduly compress those seals, and cause failure of these seals. Because a hydraulic lift system can fail, permitting the mast to drop, such systems may include a latching mechanism, to support the mast and load in an elevated position. However, this adds weight and cost. Such structures do not address the torque and load concerns of the described inspection system.

It can be seen that the foregoing do not meet all of the needs for a boom and mast structure that is rigid and torsion-resistant, and resistant to buckling and undesirable movement.

BRIEF SUMMARY OF THE INVENTION

The present invention provides a highly rigid, torsion-resistant, and buckle-resistant boom design, which may include a vertical portion, providing stable support for the supported load. This invention provides a horizontal boom section, and in a preferred embodiment includes a vertical boom section depending downwardly from the distal end of the horizontal boom section. In another preferred embodiment, the proximal end of the horizontal boom section is preferably mounted to a vertical support, such as an elevatable mast, permitting vertical movement of the boom/mast structure, and rotation of the boom structure.

In preferred mode of operation, a series of vehicles, typically tractor-trailer rigs, or cargo containers, are placed in a line parallel to the intended direction of travel of the mobile inspection unit which incorporates a preferred embodiment of the invention. The unit is propelled forward so that a scanning zone of an inspection system passes through each of the rigs or containers in succession. The data gained from these scans is viewed and interpreted by an operator in the mobile transport. Accurate alignment and minimized relative movement between the radiation source and the sensors is critical. Because the sensors are mounted upon the boom sections, it is important to increase the torsional and bending resistance, and the resistance to buckling, of those sections, particularly the horizontal boom section. Torsion forces may act upon the boom in a number of ways. For instance, forward acceleration of the mobile inspection unit, and the resistance to motion of the boom structure, will result in inertia opposing that acceleration. This effect will be increased where that resistance is placed at a distance from the source of support, such as the vertical boom structure, supported at the end of the horizontal boom structure. Other sources of torsional effects include wind resistance and accidental obstruction of the boom structure. Similarly, bending forces are present resulting from the weight of the sensors and the boom's own weight.

In a preferred embodiment, a horizontal boom section includes a continuous inner tube, or rod, which runs the length of the horizontal boom section. This inner tube penetrates several flanges arrayed along the length of the boom section. The flanges are preferably perpendicular to the inner tube, and are joined to it at the penetration. Individual, discontinuous, outer tube segments are placed outwardly of the inner tube, preferably concentrically, between and abutting, but not penetrating, the flanges. The outer tube segments are joined at their ends to the flanges' faces, preferably in grooves sized to those segments. Inward-facing C-channel beams, running the length of the horizontal boom section, are joined on their inward faces to the flanges' side edges, preferably congruently. Tensioning cables provide upward support for the ends of the structure, and permit a torque to be applied to straighten the structure.

Preferably, the boom further includes a vertical boom section, including a set of continuous tubes, or rods, which run the height of the vertical boom section, and penetrate several flanges arrayed along its height. The several flanges are substantially perpendicular to the vertical, and preferably congruent to inward-facing C-channel sections. The C-channel sections run the height of the vertical boom section, and are joined to the flanges. In a particularly preferred embodiment, a joint is provided roughly in the middle of the vertical boom section, permitting the lower segment to be folded upwardly against the upper segment, reducing the overall length of the vertical boom section for ease of stowage.

In a preferred embodiment, in order to facilitate elevation and rotation of the boom relative to a mobile transport, a mast-head and mast assembly are provided. The horizontal boom section, to which the vertical boom section is preferably mounted, is mounted to a mast-head, which is itself mounted to a mast assembly. The mast assembly is mounted to the chassis of the mobile transport. A mast assembly includes a mast guide and an elevation system to elevate the mast and the boom structure supported thereby. The mast-head is mounted to the top of the mast assembly, facilitating joinder of the horizontal boom section to the mast. The mast-head includes a rotation drive for rotating the boom structure. A counterweight structure may also be mounted to the mast-head, opposing the torque created by the weight of the boom structure.

The mast is preferably rigid, resistant to torque, and transmits out-of-vertical forces to the chassis without adversely affecting operation of the elevation system. In a preferred embodiment, a composite mast, formed of a two-by-two square grouping of hollow square-section tubes provides such rigidity and strength. The mast assembly further preferably includes a guide for the mast, which includes four similar hollow square-section tubes fixed to the chassis outwardly of the corners of the mast, and rollers between the mast corners and the inner corners of the guide. Preferably, several sets of rollers are positioned at varying heights along the mast. The rollers permit translation of the mast relative to the guide, which is fixed to the chassis, but transmit to that chassis the forces out of the vertical, created by torque of the weight of a boom or load. The elevation system also preferably includes a screw and a screw jack, which require little power for operation and are very reliable. This system has advantages over alternatives, such as a hydraulic lift for a similar mast, or a mast formed of a hydraulic piston. The weight and cost of an additional latching system are avoided by using the screw jack system, which does not depend upon a hydraulic power source for lift, and can maintain position without power input. The present invention also avoids compression and failure of hydraulic seals by omitting them and transmitting any lateral loads via rollers, which are designed to transmit this load to the guide.

In a further preferred embodiment, loads supported by the boom sections include their own weight and sensors for detecting transmitted radiation for inspecting vehicles and containers inward of and below the boom. Various types of sensors may be used, such as transmission, backscatter, sidescatter and forward scatter detectors. In this preferred embodiment, the boom structure is mounted on a mast, itself mounted to the chassis of a mobile transport. The boom sections may be rotated relative to the mast, to a position in which they extend roughly perpendicular to the transport's direction of forward travel. The bottom end of the vertical boom section preferably extends proximate the ground surface. In this position, the horizontal and vertical boom sections form, with the adjacent side of the transport, an essentially planar rectangular scanning zone. A radiation source, typically an X-ray emitter, is mounted on the mobile transport, along with the necessary support equipment, power source and operator. The X-ray device emits penetrating radiation into the scanning zone and toward sensors mounted upon the inward face of the vertical boom section, and upon the lower face of the horizontal boom section. The X-ray device may provide coverage of the scanning zone by repeatedly sweeping a narrowly focussed beam aligned to the plane, or by other techniques permitting radiation transmission covering a planar area. If the radiation would tend to penetrate the sensor, or the boom's structural material, additional absorptive material, such as lead, may be employed to do so.

The further scope of the invention will become apparent upon the review of the detailed description of the preferred embodiments. It should however be understood that these descriptions do not limit the scope of the invention and are given as examples only, and that various changes and modifications which are fully within the scope of the present invention will become apparent to those skilled in the art.

BRIEF DESCRIPTION OF THE DRAWINGS

The present invention is more easily understood with reference to the drawings, in which:

FIG. 6C is a partial cutaway elevation of the mast-head.

FIG. 6D depicts section F—F of the mast-head.

FIG. 13A is a front view of a terminal flange.

FIG. 13B is a side view of the terminal flange of FIG. 13A.

FIG. 14A is a plan view of the mast-head extension, with the cover panel removed, showing joinder to the mast-head.

FIG. 14B is an elevation of the mast-head extension with the sheeting removed, showing joinder to the mast-head.

DETAILED DESCRIPTION OF THE PREFERRED EMBODIMENT

Figure 1A:
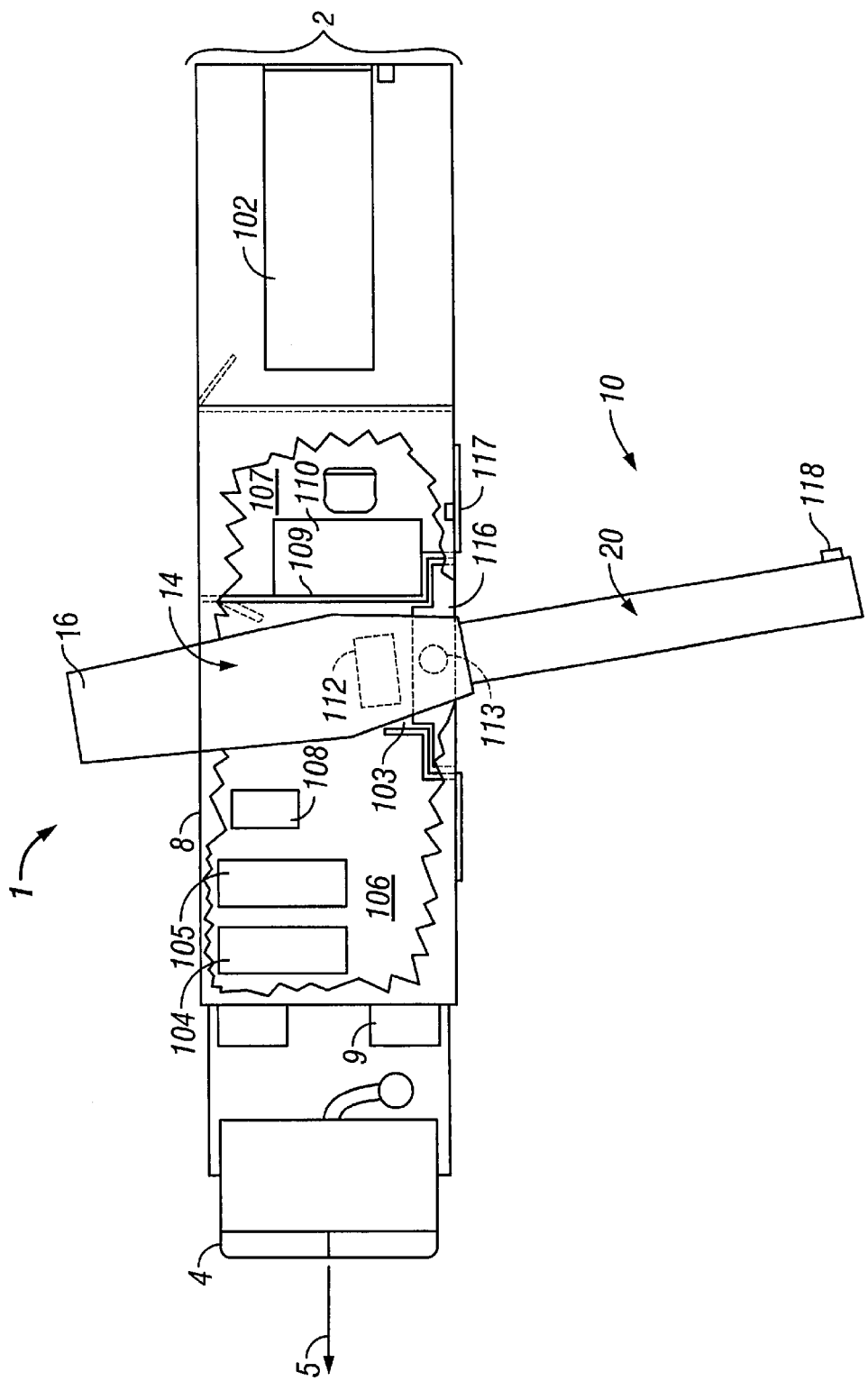
FIG. 1A is a partial cutaway top view of the mobile inspection unit depicting the boom assembly in the deployed position.

Referring now to the accompanying figures, and in particular to FIGS. 1A–1D, a specific preferred embodiment of the present invention is depicted as mobile inspection unit 1 including instrument boom 10. Instrument boom 10 includes horizontal boom section 20, vertical boom section 22; sensor packages 24, and associated mast assembly 12. Mast assembly 12, mounted on chassis 6 of mobile transport 2, includes mast 13, mast-head 14, mast guide 15, counter-weight 16 and turntable bearing 17.

Figure 2A:
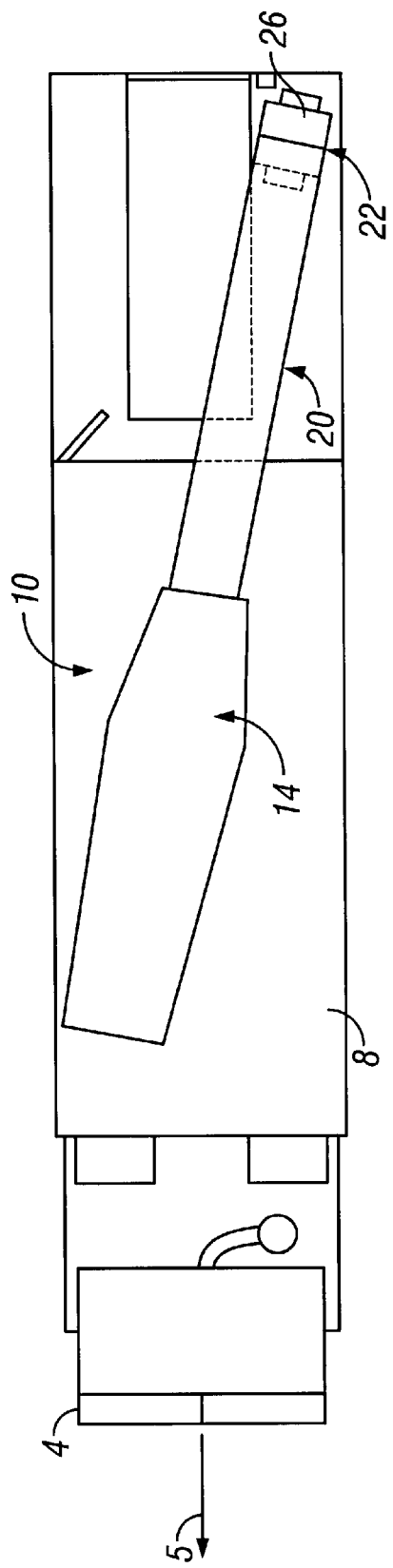
FIG. 2A is a top view of the mobile inspection unit depicting the boom assembly in the stowed position.
Figure 2B:
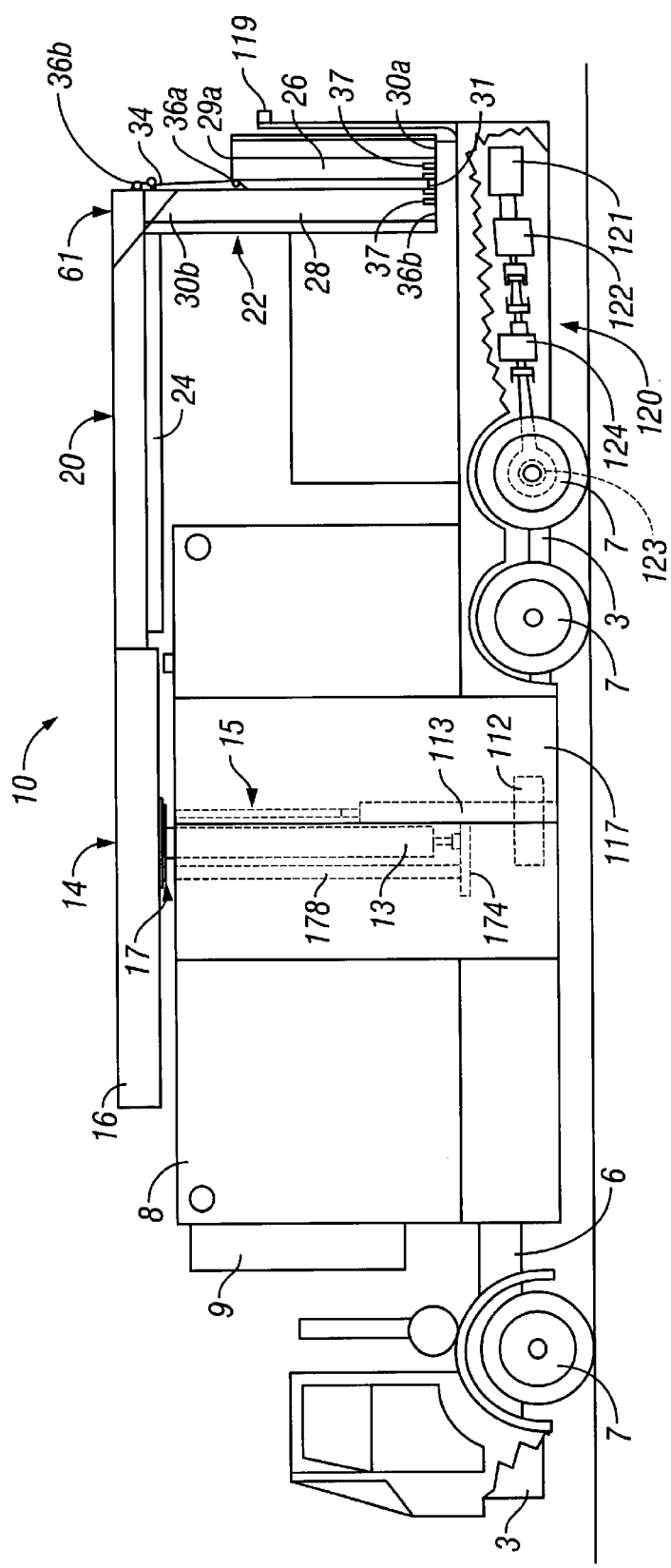
FIG. 2B is a partial cutaway elevation of the mobile inspection unit depicting the boom assembly in the stowed position.

Referring also to FIG. 2B, mobile inspection unit 1 may be self-propelled and operated from cab 4, or may incorporate an independent tractor (not depicted). Inspection unit 1 moves along movement axis 5 (FIG. 1A), normally also the longitudinal axis of the unit. Mobile inspection unit 1 includes mobile transport 2, which will ordinarily have a conventional main drive system 3, suitable for propelling mobile inspection unit 1 on ordinary roads or highway systems. Drive system 3 may include such conventional components as a diesel engine, transmission, drive shaft, suspension components, axles, brakes and a steering system for steering the front set of wheels 7. Mobile transport 2 further includes chassis 6, and transport body 8. Transport body 8 is mounted on chassis 6 in a conventional fashion, while chassis 6 is supported by wheels 7. The number and arrangement of wheels may vary with the load to be borne, the desired chassis size and the use of an independent tractor.

Figure 1B:
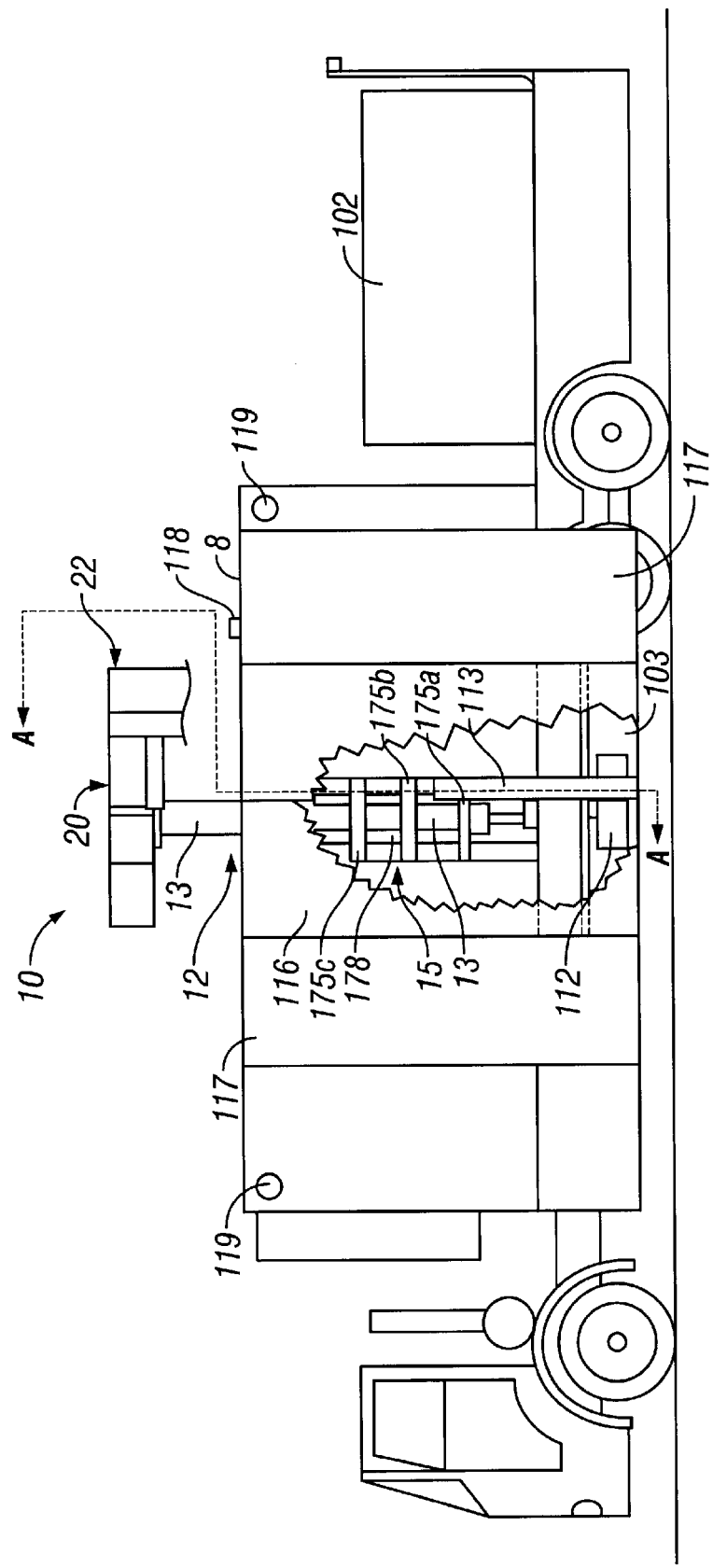
FIG. 1B is a partial cutaway elevation of the mobile inspection unit depicting the boom assembly in the deployed position.

Referring to FIG. 1A, transport body 8 comprises forward compartment 106, and operator compartment 107, preferably separated by wall 109. Forward compartment 106 includes cathode unit 104 and anode unit 105, which are operably connected to radiation emitter 112 in a manner known to persons skilled in the art. Emitter 112 is capable of emitting penetrating radiation suitable for inspection of vehicles and containers for contraband such as illegal drugs, weapons and the like. Emitter 112, in the preferred embodiment is an X-ray emitter; any of several types of emitters may be employed depending upon target composition and other design criteria. Oil cooler 108 is preferably included, and provides cooling for cathode and anode units 104, 105; its capacity may be determined by a person of ordinary skill based upon the cooling needs of the specific equipment utilized. Referring to FIGS. 1A, 1B, power is supplied by generator 102, preferably capable of providing 100 kW three-phase power, mounted upon the rear portion of chassis 6. A model DCA-100 by M.Q. Power is acceptable. Cooling for transport body 8 is provided by air conditioning units 9, preferably three-ton models, mounted upon transport body 8.

Figure 1C:
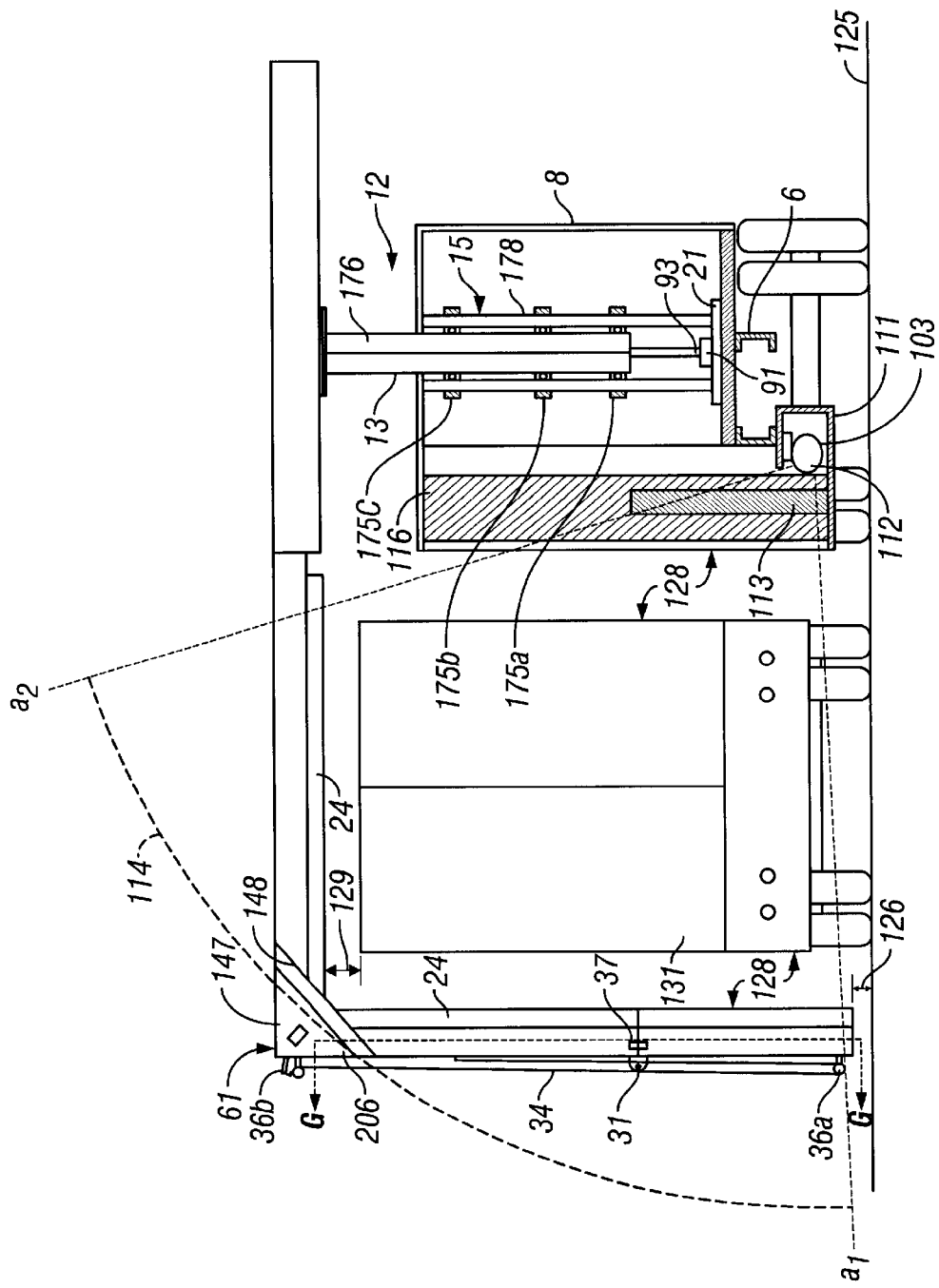
FIG. 1C depicts partial section A—A of the mobile inspection unit.

Referring to FIGS. 1B and 1C, equipment compartment 103 is adjacent forward compartment 106, and the exterior of transport body 8, and houses emitter 112, beam collimator 113 and backscatter detectors 116. Preferably, in order to mount emitter 112 close to ground 125 to permit inspection of low portions of target 131, subfloor 111 is used, supporting emitter 112 and collimator 113. Subfloor 111 is preferably mounted as low as 12 inches above ground 125. Emitter 112 should be mounted in such a manner as to reduce movement relative to instrument boom 10, and preferably in a rigid fashion, directly or indirectly, to chassis 6. In operation, protective doors 117 are opened to expose this equipment to inspection target 131. Protective doors 117 may also be closed, as in FIG. 2B, during transport or otherwise to protect the equipment.

In FIGS. 1A–1C, emitter 112, operating with cathode and anode units 104, 105, emits penetrating radiation aligned with the deployed position of instrument boom 10. This penetrating radiation preferably passes through collimator 113, which narrows this beam in a fore and aft direction and restricts it to a roughly planar scanning zone 114, which is directed toward sensors 24. Sensors 24 are suitable for detecting penetrating radiation emitted by emitter 112. Scanning zone extends from an angle a1, preferably below horizontal, to angle a2, above horizontal. Preferably, scanning zone 114 extends from about 4 degrees below the horizontal to about 74 degrees above. These values may differ depending upon the size of target 131 and its placement relative to emitter 112, and may be determined by a person of skill in the art.

Turning to FIGS. 1B, 1C, 10 and 12, mast guide 15, a portion of mast assembly 12, is also located within forward compartment 106. Mast guide 15 encloses and supports mast 13, and the mast elevation system. Mast guide 15 is mounted, preferably by welding, to mast assembly base 21. Base 21 is mounted to mobile transport 2, preferably to chassis 6, providing support for instrument boom 10. Mast 13, supported by guide 15, acts as a vertical support of the end of horizontal boom section 20. In different embodiments, an end support, which may provide one or both of vertical support or torque for horizontal and vertical boom sections 20, 22, may also be provided directly by a mast-head structure, the mast itself, or another supporting structure, known to a person of ordinary skill in the art.

Figure 10:
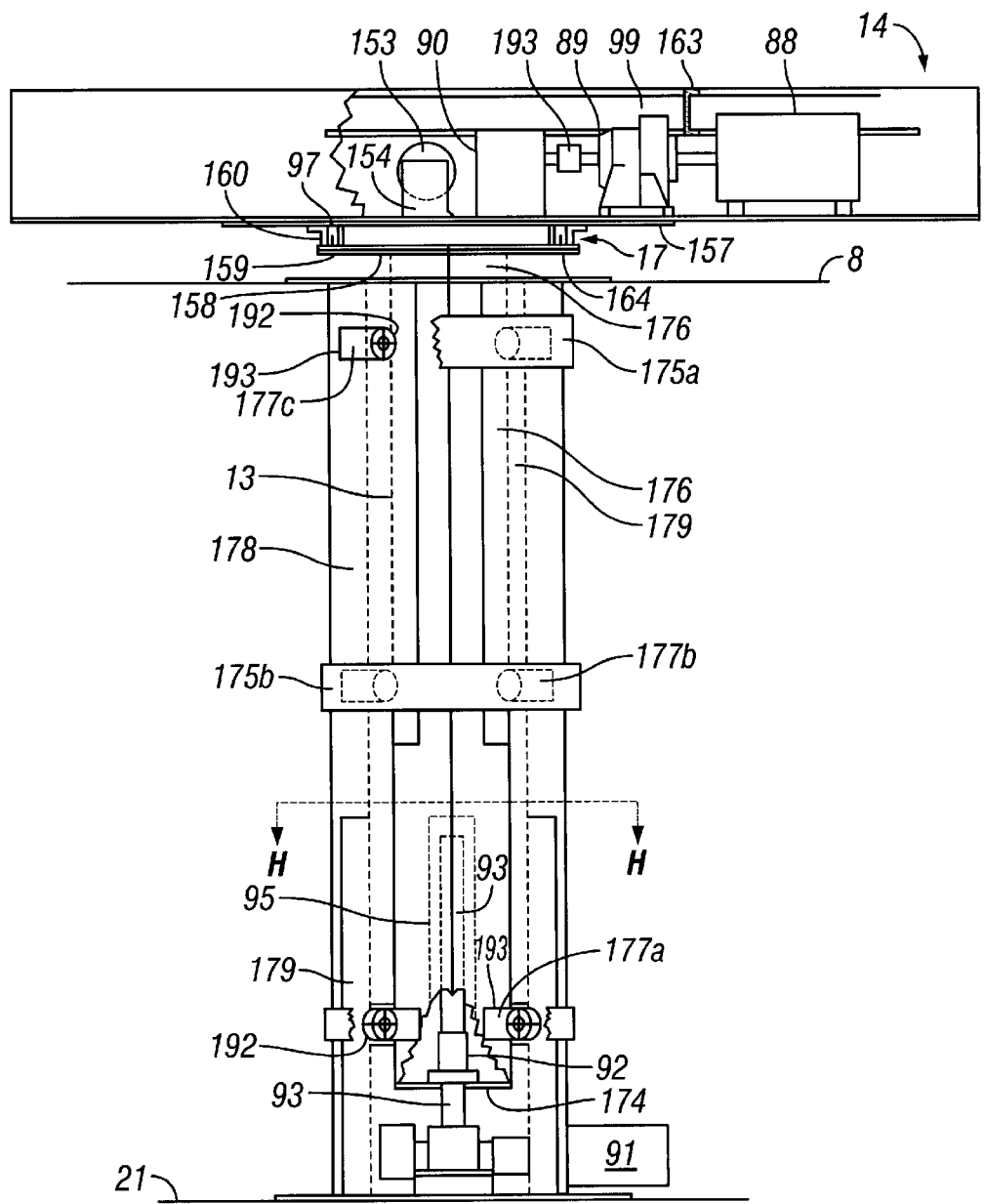
FIG. 10 is a partial cutaway of detail of the mast assembly and rotation system.
Figure 12:
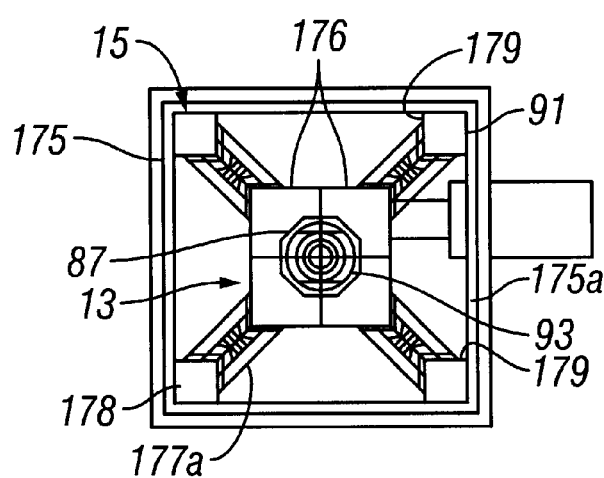
FIG. 12 depicts section H—H of the mast assembly.

Referring to FIGS. 1C, 10 and 12, the mast elevation system preferably includes screw jack 91, hub nut assembly 92 and screw 93. Screw jack 91 includes an electric motor and a jack, and is mounted to assembly base 21. A ½ to 1 H.P. motor, and a ten-ton load capacity jack, for transferring the input of the motor to screw 93 were found acceptable. In a preferred embodiment, an ACTIONJAC brand model no. 10BSJ jack is used in screw jack 91. Screw jack 91 rotates screw 93, which acts upon hub nut assembly 92 to elevate mast 13 within mast guide 15. Hub nut assembly 92, within which screw 93 rotates, translates screw 93's rotation to motion along a vertical axis aligned with screw 93 and hub nut assembly 92; preferably this vertical axis is aligned with mast 13's vertical axis. Hub nut assembly 92 incorporates multiple sets of ball bearings transferring the load of mast 13 to screw 93, and is advantageous over other options, such as a simple hub threaded to screw 93, by offering lower resistance to operation, needing less lubrication, and having a lower power requirement for the motor for screw jack 91. Hub nut assembly 92, fixed to mast 13 via mast baseplate 174, transmits the vertical motion to mast 13, while screw 93 is fixed to mast elevation drive 91. Screw cutaway 95, formed by removing interior portions of mast tubes 176, permits rotational and translational movement of screw 93 relative to mast 13. Screw guard 87, preferably fixed within screw cutaway 95, prevents other components, e.g. cabling, from contacting screw 93, and either damaging that component or fouling screw 93.

In another embodiment, the mast elevation system comprises a hydraulic piston assembly fixed to mast 13, including a hydraulic pump, a piston acting upon mast 13, preferably upon baseplate 174, controls and, preferably, a latching mechanism. The latching mechanism is used to maintain elevation of mast 13 should the hydraulic system lose pressure or otherwise fail. Failure, and uncontrolled dropping of mast elevation, during operations, could result in horizontal boom section 20 contacting target 131 and significant damage to both. In this way the above screw jack system is advantageous, in that such a latching mechanism is unnecessary.

Remaining with FIGS. 1C, 10 and 12, operation of the mast elevation system raises instrument boom 10, about 22 inches in a particularly preferred embodiment, to create top clearance 129 between target 131 and sensor package 24 on horizontal boom section 20, when instrument boom 10 is in the deployed position. In the preferred embodiment, top clearance 129 is between about six and about eight inches, and this results in sensor package 24 being about 168–169 inches above ground 125 when instrument boom 10 is in fully raised position, as depicted in FIG. 1C. Ground clearance 126 between lower boom segment distal end 29a is preferably about five inches in the deployed position. In the raised position of this preferred embodiment, the top of instrument boom 10 is about 184 inches above ground 125, and the bottom of sensor package 24 on horizontal boom section 20 is about 168 inches above ground 125. Turning to FIG. 2B, in this preferred embodiment's lowered position, the underside of mast-head 14 clears the top of transport body 8 by about 6 inches, while sensor package 24 is about 146 inches above ground 125, and when in the stowed position, stowed clearance 132 is about four inches above the top of transport body 8, and the top of boom 10 is no more than 162 inches above ground 125. Returning to FIG. 1C, horizontally, there is preferably at least about 144 inches between protective doors 116, on the working side of transport body 8, and sensor package 24 on vertical boom section 22, which permits side clearance 128 of about 21 inches on either side of a target 131 having a road-legal width of 102 inches.

Remaining with FIGS. 1C, 10 and 12, mast 13 comprises a plurality of mast sections and guide rails 179. In a preferred embodiment, the mast sections are four mast tubes 176, and in a particularly preferred embodiment, mast tubes 176 are hollow, squared tubes, about six inches square in section, having a wall thickness of about ⅜ inch, and are about 96 inches in height. Mast tubes 176 are preferably constructed of stainless steel or another steel suitable for the predicted loading. Preferably, four mast tubes 176 are arranged in a parallel fashion in a square two-by-two array, and are mounted together by welding intermittently along the exposed seams/edges between the tubes. Mast baseplate 174 is also fixed, preferably by welding, to the lower ends of mast tubes 176, which assists the tubes to retain their configuration. Mast top plate 164 is similarly fixed to the upper ends of tubes 176. Mast 13 is aligned on a translation axis, preferably vertical, as is mast guide 15, to permit vertical translation. Mast tubes 176 are mounted at their upper end, via mast top plate 164, to lower plate 158 of turntable 17, in FIG. 16, preferably by welding. Preferably, four guide rails 179 are mounted to the outer corners of the square array of mast tubes 176, by fixing the inner face of the rail to the exposed outer corner of each of mast tubes 176. In one embodiment, guide rails 179 comprise ⅜ thickness, four inch width angle pieces, about 88 inches in height, preferably made of stainless steel or other suitable steel materials. Other designs for an elevatable mast are known to persons of skill in the art.

Remaining with FIGS. 10 and 12, mast guide 15 comprises guide tubes 178, one or more sets of roller assemblies 177 and additional guide rails 179. Guide tubes 178 are joined at their bases to mast assembly base 21, preferentially by welding. Guide tubes 178 are preferentially arranged outwardly from the exposed outer corners of mast 13, radially and symmetrically from the center of mast 13, preferably such that four guide tubes 178 are outward of the corners in both the forward/aft and side-to-side directions, and are positioned parallel to each of mast tubes 176. In one embodiment, guide tubes 178 are about four inches square in section, have a wall thickness of about ⅜ inch, are about 88 inches in height, and are preferably constructed of stainless steel or another suitable steel. Similarly to mast tubes 176, guide rails 179 are mounted at their inner face to the corners of guide tubes 178 opposite to the outer corners of mast 13. Rails 179 need not be the full length of tubes 178 or 176, but may rather be fixed only to that portion of the tube in contact with a roller.

Remaining with FIGS. 10 and 12, roller assemblies 177 preferably comprise rollers 192 fixed to mounts 193. Preferably, roller 192 is a steel, yoke-style roller, having a V-groove; such rollers with bearings rated for 12,000 pound thrust limit were found to be acceptable. Mounts 193 are preferably an angled bracket having an adjustable yoke fitting to accept a yoke-style roller and to adjust the position of the roller with respect to the rail. Other roller assembly components known to a person skilled in the art may be acceptable. In a preferred embodiment, mast guide 15 comprises three sets of four roller assemblies 177 each, all of the assemblies in a given set being labeled with the same suffix, 177a–177c respectively. However, sets need not have four roller assemblies; while four opposing assemblies are advantageous, two symmetrically opposed assemblies per set could also be used, for instance with a further set having such opposed assemblies oriented to a different axis than the first, thus guiding the mast in more than one axis normal to the translation axis. Each such assembly preferably comprises one roller 192 and mount 193, and each assembly 177 mounted to either mast 13 or to guide tubes 178, and placed opposing guide rails 179 on either tubes 178 or mast 13. Rollers 192 are in rolling contact with tubes 178 or mast tubes 176, or preferably, with guide rails 179 on those tubes. This provides a low-friction manner of transmitting forces out of the translation axis, here vertical, from mast 13 to guide tubes 178. In this manner, roller assemblies 177 inhibit translation of mast 13 out of that translation axis.

In a preferred embodiment, a set of lower roller assemblies 177a are mounted to mast 13, near its bottom using mounts 193, while intermediate roller assemblies 177b, and upper roller assemblies 177c are mounted to guide tubes 178 in a fixed relationship to one another, with upper roller assemblies 177c placed near the upper portion of guide tubes 178, also using mounts 193. This permits rollers lower assemblies 177a to continue to guide mast 13 as it moves upwardly, and avoids the upper assemblies 177c interfering with upward movement of mast 13. Positioning of sets of roller assemblies 177 along the translation axis may vary as design criteria such as needed height of the mast, or elevation vary, but positioning the set of lower roller assemblies 177a at or near base plate 174, and positioning the sets of intermediate and upper assemblies 177b, 177c about 65 and 86 inches, respectively, above assembly base 21 was found to be acceptable.

Remaining with FIGS. 10 and 12, mast guide 15 preferably further comprises reinforcement straps 175. Strap sets 175 should be distributed along guide 15, and placed at points to oppose lateral forces that might cause a guide tube to buckle. In one embodiment, three strap sets 175a–175c are located in positions corresponding to the vertical positions of sets of roller assemblies 177. In another embodiment, two strap sets 175a', 175b' are roughly evenly spaced along the height of guide tubes 178, and are about 30 and 70 inches above assembly base 21, respectively. Strap sets 175 in these embodiments are preferably metal bars, about three inches wide, and about ⅜ inch thick, reaching from one guide tube 178 to the adjacent guide tube, and welded thereto. Strap sets 175 are made of a metal suitable for welding to guide tubes 178.

Figure 6A:
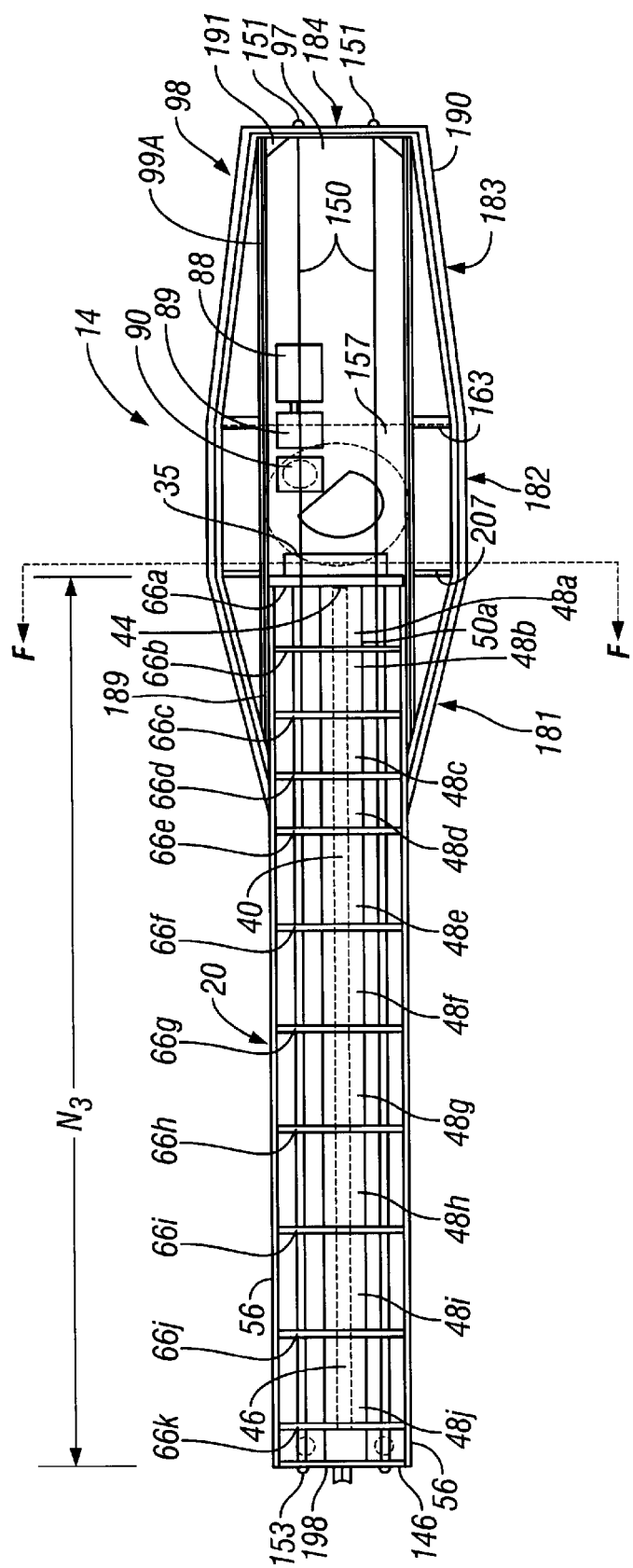
FIG. 6A depicts section D—D of the instrument boom.

Turning to FIGS. 6A, 6C and 6D, mast-head 14 preferably comprises mast-head plate 97, reinforcement plate 157, mast-head frame 98, boom joints 99, boom joint supports 100, mast-head cover plate 101, and sheeting 185. In one embodiment, mast-head 14 is constructed of stainless steel, while in another, it is constructed of galvanized steel. An acceptable stainless steel for the components of mast-head 14 is 316L stainless steel. Another acceptable steel for the components of mast-head 14 is a galvanized hot-rolled structural channel steel, such as ASTM A36 mild steel. Plate 97, in one embodiment, is roughly coffin-shaped viewed from above (in FIG. 1A), is flat and about ⅜ inch thick, and has forward, middle and rear sections, the first and last being tapered to substantially square ends. Plate 97's length, aligned with the longitudinal axis of the horizontal boom section, is about 156 inches, and is about 48 inches wide at its widest, in the middle section, which is about 36 inches long. The forward section of plate 97, adjoining horizontal boom section 20, is about 48 inches long, and tapers to about 36 inches wide. The rear section of plate 97, supporting first counterweight 16, is about 72 inches long, and tapers to about 36 inches wide.

Figure 11:
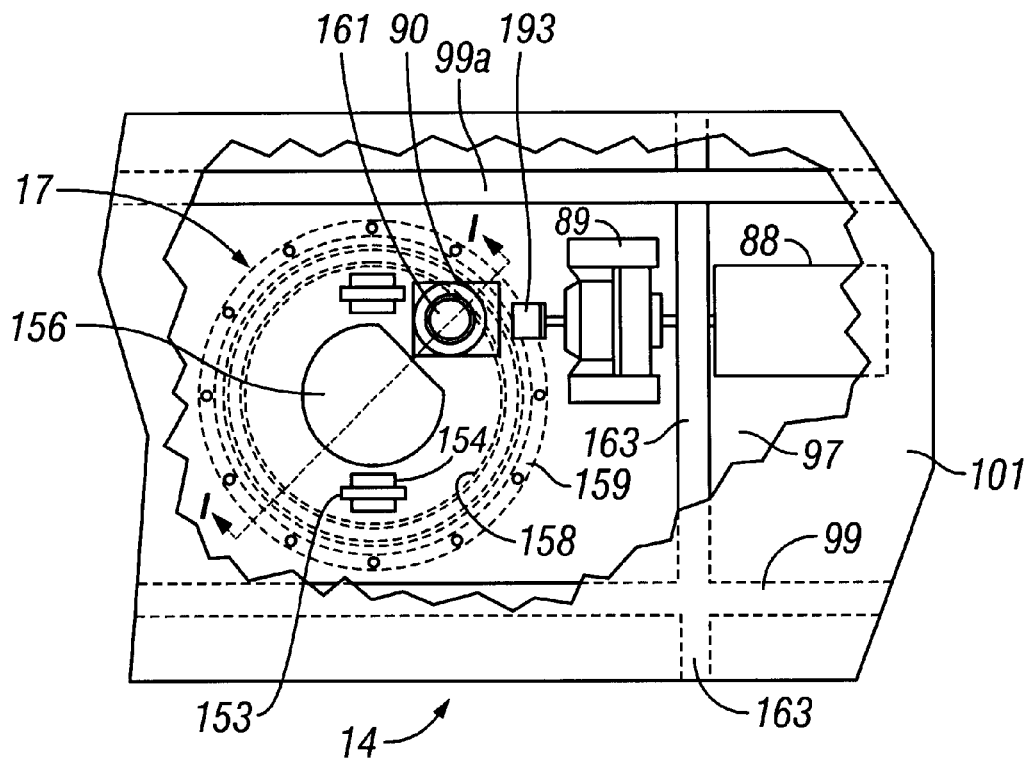
FIG. 11 is a partial cutaway top view of the rotation system.
Figure 16:
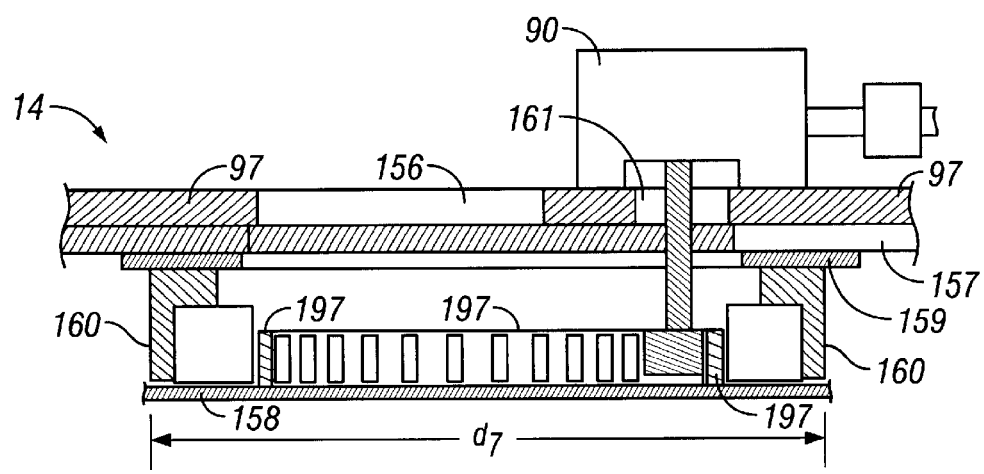
FIG. 16 depicts detail of section I—I.

Referring to FIGS. 11 and 16, the middle section of plate 97 has several holes defined through it, including access hole 156, centered above turntable 17, and 90-degree drive hole 161, set slightly off to the side of hole 156. Preferably, access hole 156 is partially circular about 12 inches diameter, having one side, preferably to the side and rear, flattened off chord-wise about two inches. Also preferably, drive hole 161 is oval and is aligned along the radial of hole 156 normal to the flattened chord, about four inches from that flattened portion. Drive hole 161 has a minor and major diameters of about six and ten inches.

Referring to FIGS. 6A and 10, reinforcement plate 157 is preferably mounted below mast-head plate 97, in the area in which mast-head 14 is supported by mast 13, and is preferably roughly square, about ½ inch thick, and about 48 inches in length and width, and has the corners rounded off. In another embodiment mast-head extension 18, supporting secondary counterweight 19, may be joined to the rear section of plate 97, beyond rearframe 184.

Turning to FIGS. 6A, 6C and 6D, mast-head frame 98 lies above the surface of mast-head plate 97, and preferably conforms substantially to the periphery of plate 97. Frame 98 comprises a forward transition 181, a middle section 182, a rear transition 183 and rear frame 184. The preceding four each comprise upper, middle and lower frames, designated with the suffixes a, b and c, respectively. Upper frames 181a–184a, and lower frames 181c–184c, are preferably five inch C-channel beams, about ¼ inch thick, placed such that the legs of the beams point inwardly into mast-head 14, and run parallel to the periphery of plate 97. More preferably, upper frames 181a–183a, and lower frames 181c–183c, are formed of single pieces of C-channel, having the legs notched, to permit bending the web at the forward transition 181—middle section 182 and middle section 182—rear transition 183 junctions. Using single pieces lends strength to these junctions. The lower set of legs of lower frames 181c–184c abut plate 97, while the upper set of legs of upper frames 181a–184a abut mast-head cover panel 101. Separating the "a" and "c" frame sets are middle frames 181b–184b, which are also preferably 5-inch C-channel beams, but cut to three inch lengths, and set endwise between the upper and lower frames. Middle frames 181b–184b are welded at their "C"-shaped ends to the lower legs of upper frames 181a–184a, and the upper legs of lower frames 181c–184c, respectively, with the legs of middle frame 181b–184b pointed toward the interior of mast-head 14. Middle frames are located at several locations along the upper and lower frames, preferably at or near the points of transition between forward, middle and rear transitions 181–183 and rear frame 184, as well as one or more locations intermediate thereto.

In one embodiment, each of forward transition frames 181 are about 13 inches high, and run about 49 inches along the side edges of the forward section of plate 97. Similarly, each of middle section frames 182 are about 13 inches high, and run about 36 inches along the edge of the middle section of plate 97, and each of rear transition frames 183 are about 13 inches high, and run slightly more than about 72 inches along the side edges of the rear section of plate 97. Preferably, a single piece of channel about 157 inches long is used for upper and lower frames 181a–183a, 181c–183c. Rear frame 184 is also about 13 inches high and runs about 36 inches along the rear edge of plate 97. Lower frames 181c–184c are preferably both welded and bolted to mast-head plate 97. Mast-head frame 98 also comprises front frame 180, which is at the front of mast-head plate 97, and is only a portion of the height of frames 181–184, preferably about 3 inches, to accept horizontal boom section 20. In one embodiment, front frame 180 is 3-inch angle bracket, ¼ inch thick; in another, it is a tube having a roughly three-inch square hollow section. Preferably, sheeting 185 is mounted to mast-head frame 98 on its outward side, and may comprise ⅛ inch 5052 aluminum sheet.

Mast-head 14 also preferably comprises upper and lower boom joints 99a, 99b, rear boom joint 207, and boom joint supports 100. Boom joints 99a, 99b and 207 are beams structurally connecting horizontal boom section 20 to mast-head 14, and are preferably five inch C-channel, having legs 188 extending from inner surface 186. There are preferably two each of upper and lower boom joints 99a, 99b, one upper and one lower on each side of horizontal boom section 20, placed alongside and parallel to proximal ends 62 of beams 56, and so that outer surfaces 187 of boom joints 99a, 99b abut the outer surface of beams 56, and inner surface 186 and legs 188 face away from horizontal boom section 20. In a particularly preferred embodiment, upper boom joints 99 are about 156 inches long, and may be constructed of 304L stainless steel or another acceptable steel suitable for welding to mast-head 14. Upper boom joints 99a extend forwardly from rear frame 184a to the forward end of mast-head 14, at the forward end of forward transition 181a. Lower boom joints 99b, shorter than the upper ones, extend forwardly from rear boom joint lower joint section 207c to the forward end of mast-head 14, at the forward end of forward transition 181c. Boom joints 99a, 99b are joined to horizontal boom section 20, preferably by structural bolts 206 distributed along its length, and with rear boom joint 207, support boom section 20, and thereby boom section 22. In addition, angle bracket 149, welded to the exterior of forward transitions 181, is placed with one leg flush to the opening for boom section 20, and is bolted to boom section 20.

Upper boom joints 99a are supported above lower boom joints 99b, and above plate 97, by several boom joint supports 100, and are preferably braced in that position by several transverse braces 163. Supports 100 are preferably sections of five-inch channel, in which the legs run vertically, and support upper beam joints 99a at their lower legs 188 at numerous places along their length. Two transverse braces 163 are positioned in a transverse relationship with each of upper boom joints 99a, between inner surfaces 186 and mast-head frame 98. Preferably, braces 163 are short sections of 3-inch by ¼ inch angle bracket, and are located near proximal ends 62 of beams 56, near the joint between forward transition 181 and middle section 182, and near the joint between middle section 182 and rear transition 183. Also preferably, rear gussets 191 are joined between boom joint inward surface 187 and upper rear frame 184a. In a particularly preferred embodiment, braces 163 are about six inches in the dimension long, are joined such that the legs run from inner surfaces 186 to frame 98.

Referring to FIG. 6D, rear boom joint 207 is placed transversely between upper and lower boom joints 99a, 99b, and immediately rearwardly of horizontal boom section 20. Rear boom joint 207 preferably comprises upper and lower joint sections 207a, 207c, and middle section 207b. Boom joint sections 207a, 207c are preferably five inch C-channel, and comprise distal and proximal faces 209, 210, legs 212 rising from the proximal face, and ends 211. Upper section 207a further comprises tension cable chases 208, and lower section 207c, longer than upper section 207a, defines cut-away sections 213. Middle sections 207b are similarly five inch C-channel sections, cut to three-inch lengths and joined to the upper and lower sections in a manner similar to that used in frames 181–184. Middle sections 207b are placed to either side of proximal end 44 of tube 40, which is exposed at flange 66a. Distal faces 209 of rear boom joint 207 abut proximal face 68a of flange 66a, as well as proximal ends 62 of beams 56. Rear boom joint 207 is joined to horizontal boom section 20, at these abutting surfaces, preferably by several structural bolts 206 distributed across rear boom joint 207.

Turning to FIGS. 14A and 14B, in another embodiment, mast-head extension 18, for supporting secondary counterweight 19, is attached to mast-head 14. Extension 18 comprises extension plate 217, extension frame 218 and extension cover panel 222. Extension 18 may be either a stainless steel alloy, or galvanized steel, but the material should match that used for mast-head 14. Plate 217 is preferably one-inch plate, and about 48 inches long, measuring longitudinally from its point of attachment to mast-head 14. The joined end preferably matches the rear end of mast-head 14 and is about 36 inches wide, while the opposite, rear, end is tapered to about 20 inches wide. Frame 218 comprises extension rear frame 219 and two side frames 220, which preferably extend from mast-head rear frame 184 rearwardly to extension rear frame 219. Rear and side frames 219 and 220 are constructed similar to frames 181–184, using lengths of 5 inch C-channel forming upper frames 219a, 220a and lower frames 219c, 220c, and short lengths, preferably three inches, of cut channel welded therebetween, forming middle frames 219b, 220b. Frame 218 further includes angle bracket 221, preferably 2 by 2 inch by ⅜ inch thick, attached to the front edge of plate 217, with a vertical face aligned upwardly at that edge.

Secondary counterweight 19 is mounted, or otherwise fixed, within extension 18, preferably to plate 217, and preferably as near to extension rear frame 219 as practicable, to maximize the counterweighting effect. Should secondary counterweight 19 be sufficient to balance instrument boom 10, first counterweight 16 may be omitted entirely. In one embodiment, secondary counterweight 19, comprising about 2,400 pounds of lead sheet, was sufficient to balance instrument boom 10. Frame 218 is mounted to plate 217 by welding the lower leg of lower side frames 220c and rear frame 219c to plate 217, and by using bolts 206 to connect the two components. Mast-head extension 18 is mounted to mast-head 14, preferably by welding the joined, wider, end of extension 18 to the rear edge of mast-head plate 97 and rear frame 184a–184c. In a particularly preferred embodiment, the wider end of extension plate 217 is welded to the rear edge of plate 97, the vertical face of angle bracket 221 is welded to lower rear frame 184c, and the forward ends of upper and lower side frames 220a, 220c are welded to corresponding upper and lower mast-head rear frames 184a, 184c. Cover panel 222 may be fixed to extension 18 using panel bolts 155. As a further alternative, plates 97 and 217 may be formed as a single plate.

Referring to FIGS. 6C, 6D and 10, mast-head cover 101 is mounted to and above mast-head frame 98. Cover 101 is preferably light plate conforming substantially in shape to mast-head plate 97, and to the periphery of mast-head frame 98. In a particularly preferred embodiment, cover 101 comprises several ⅛ inch thick aluminum plates, which together are roughly shaped as mast-head plate 97. The various plates of cover 101 may be mounted to frame 98 using bolts 155.

Mast-head 14 is preferably constructed as follows. Joinder is preferably by welding, more preferably by a MIG (gas metal arc) welding process. A welding process using a 200 ampere MIG welder, manufactured by Miller Electric Mfg. Co., 1635 West Spencer Street, P.O. Box 1079, Appleton, Wis. 54912, has been found to be satisfactory, although a higher amperage rating may be desirable to reduce any need for preheating the aluminum material. A pure argon shielding gas was acceptable. A SPOOLMATIC 30A automatic wire feed system, also by Miller Electric, was used to feed a 0.035 inch ER 4043 aluminum alloy wire to the MIG welder. If necessary, preheating may be accomplished using an oxy-acetylene or propane torch. Other methods of accomplishing joinder between metal objects known to a person of skill in the art may be satisfactory, such as TIG-type welding, and will depend upon the specific compositions and heat treatment of the materials used. In addition, the above techniques are suitable for horizontal and vertical boom sections 20, 22, mast assembly 12, and box joint 59.

Referring to FIGS. 6C and 6D, mast-head 14 is constructed in the following preferable sequence: plate 97 is pre-drilled with holes to accept bolts 206, and is supported for the construction process slightly higher at the forward and rear ends to induce a slight "sag" in the area to be joined to middle section 182. This sag is induced to counteract the hogging effect created by applying the loads to mast-head 14, counterweights 16, 19 and horizontal and vertical boom sections 20, 22 at its two ends. A slight, visible, sag at that middle section was found to be acceptable. The lower legs of lower frames 181c–184c of frame 98 may also be pre-drilled with holes for bolts 206. Further, referring now to FIG. 6A, the legs of the single pieces comprising upper frames 181a–183a and lower frames 181c–183c are preferably previously notched to permit the bends in the web to form the angled transitions between forward transition 181 and middle section 182 and between middle section 182 and rear transition 183. In addition, one end of the single pieces, and both ends of rear frames 184a, 184c, are preferably previously bevel cut in order to facilitate miter joints at the angled transitions between rear transition 183 and rear frame 184. Tack-welding, and clamping may be utilized in this construction process in order to counteract heat expansion difficulties.

Returning to FIGS. 6C and 6D, the lower leg of the single piece of channel comprising lower frames 181c–183c is placed so that its forward end is aligned with the forward end of plate 97, and permits proper placement of lower boom joints 99b. Further, its legs face inward, and its five-inch face is substantially flush with the edge of plate 97 in the forward transition, and preferably, its bolt holes are aligned to those in plate 97. Lower frame 181c–183c is then welded along both the inner and outer edges of the lower leg to the upper surface of plate 97 in forward transition 181c. Referring now to FIG. 6A, the single piece is then bent to form the angled transition between forward transition 181 and middle section 182, and lower frame 181c–183c is welded along both the inner and outer edges of the lower leg to the upper surface of plate 97 in middle section 182c. Next, the single piece is bent to form the angled transition between middle section 182 and rear transition 183, and lower frame 181c–183c is welded along both the inner and outer edges of the lower leg to the upper surface of plate 97 in rear transition 183c. Next, this process is repeated with lower frame 181c–183c located on the opposing side of plate 97. Finally, returning to FIGS. 6A, 6C, the lower leg of lower frame 184c of rear frame 184 is welded along both the inner and outer edges to the upper surface of plate 97, and the beveled edges at the ends of lower frame 184c are welded to the beveled ends of the single pieces forming lower frames 181c–183c. Once all lower frames 181c–184c are welded in place, they are bolted to plate 97 using bolts 206 (see FIG. 6D).

Next, referring to FIGS. 6C and 6D, proceeding sequentially around lower frames 181c–184c, one C-shaped end of each of middle frames 181b–184b is welded in place to the upper legs of lower frames 181c–184c. Again, the legs of the middle frames 181b–184b face inwardly, and the opposing face is aligned with the edge of plate 97. The order in which this is accomplished may vary. In one embodiment, there are middle frames located at: the forward end and midpoint of forward transition 181, at the junction of forward transition 181 and middle section 182, at middle section 182's midpoint and its junction with rear transition 183, three distributed along the length of rear transition 183, at the rear of rear transition 183, and at each end of rear frame 184. Placement of middle frames is also visible in FIGS. 14A and 14B.

Next, remaining with FIGS. 6C and 6D, the lower leg of the single piece of channel comprising lower frames 181c–183c is placed above lower frame 181c so that its forward end is aligned with the forward end of plate 97, and permits proper placement of upper boom joints 99a. Further, its legs face inward, and its five-inch face is substantially flush with the edge of plate 97 in the forward transition. Upper frame 181a–183a is then welded to the second C-shaped ends of middle frames 181b in the forward transition. Then, turning to FIG. 6A, the single piece is bent to form the angled transition between forward transition 181 and middle section 182, and the lower leg of upper frame 181a–183a is welded to the second C-shaped ends of middle frames 182b in the middle section. Next, the single piece is bent to form the angled transition between middle section 182 and rear transition 183, and upper 181a–183a is welded is to the second C-shaped ends of middle frames 183b in the rear transition. Next, this process is repeated with upper frame 181a–183a located on the opposing side of plate 97. Finally, the lower leg of upper frame 184a of rear frame 184 is welded to the second C-shaped ends of middle frames 184b in the rear transition, and the beveled edges at the ends of upper frame 184a are welded to the beveled ends of the single pieces forming upper frames 181a–183a.

Next, turning to FIGS. 6C and 6D, rear boom joint lower frame 207c, which like the lower frames, has preferably been pre-drilled, is aligned forward of access hole 156 (in FIG. 6A) to corresponding bolt holes in plate 97. Lower frame 207c is placed with its legs 212c at ends 211c abutting the legs at the forward ends of lower frames 182c. The lower leg 212c of lower frame 207c is then welded in place to plate 97, and bolts 206 are installed. Welds on upper, lower or rear boom joints 99a, 99b, 207 on outer surfaces 187, or on distal faces 207a–207c, should be avoided, at least those at or above three inches above mast-head plate 97. These surfaces are preferably left smooth for a close fit to horizontal boom section 20. However, if necessary these surfaces may be welded upon, if appropriate finishing measures, such as beveling and grinding, are used to ensure a smooth surface.

Next, remaining with FIGS. 6C and 6D, one of lower boom joints 99b, like 207c preferably pre-drilled, is aligned with the bolt holes in plate 97, which places boom joint 99b's forward end flush with the forward end of plate 97, and in contact with lower frame 181c, and its rear end abutting distal face 209 of lower rear boom joint 207c. Outer surface 187 faces inward, away from frame 98. Legs 188 at the forward end of lower boom joint 99b may be trimmed away to form a good joint with lower frame 181c, and to obtain the proper positioning; it is important that the distance between boom joint outer surfaces 187, for both upper and lower boom joints 99a, 99b, is matched closely to the overall width of horizontal boom section 20, in order to obtain a snug fit and deter "wobbling" of instrument boom 10. This width may vary depending upon material chosen for construction, but in one embodiment using a stainless steel for construction of mast-head 14, 25.125 inches was found acceptable for the distance between surfaces 187. To account for the galvanized layer's thickness, a slightly greater distance may be needed if galvanized steel is used. Lower leg 188 of boom joint 99b is welded to plate 97, its rear end to lower rear boom joint 207c, and its forward end to lower frame 181c. Lower leg 188 is then bolted to plate 97. This process is then repeated with the other lower boom joint 99b.

Next, the several supports 100 are fixed in place. Referring to FIGS. 6A, 6C and 6D, supports 100, preferably twelve, are located as follows. A first six are cut to three-inch length: two each between upper and lower boom joints 99a, 99b, near forward end 189 of upper beam joints 99a about at the midpoint of lower boom joint 99b, and at the junction of lower boom joint 99b and lower rear boom joint 207c. A second six are cut to eight-inch length: two each about even with sheave support 154, about at the transition between middle section 182 and rear transition 183, and about at the midpoint of rear transition 183. FIGS. 14A and 14B also depict placement of some of supports 100. All supports 100 are placed with their legs pointed outwardly, and the 5-inch face inwardly. The first six, three-inch supports, are welded at one C-shaped end to the upper of lower boom joint legs 188, the last extending onto the upper of rear boom joint legs 212c. The second six, eight-inch supports are welded at one C-shaped end to plate 97, in two lines extending rearwardly from lower boom joints 99b.

Next, remaining with FIGS. 6A, 6C and 6D, one of upper boom joints 99a is added. With outer surface 187 facing inwardly, away from frame 98, forward end 189 of boom joint 99a is placed above lower boom joint 99b's forward end, supported on the lower of legs 188 by supports 100. Forward end 189 should be flush with the forward end of plate 97, and in contact with upper frame 181c. Rear end 190 will abut the legs of upper rear frame 184a. Legs 188 at forward end 189 of upper boom joint 99a may be trimmed away to form a good joint with upper frame 181a, for reasons noted above. Then, the lower of legs 188 are welded to the C-shaped ends of supports 100, and forward and rear ends 189, 190 are joined to upper frame 181a and upper frame 184a, respectively. The weld to upper frame 184a may be made on boom joint outer surface 187. This process is then repeated with the other upper boom joint 99a.

Turning to FIGS. 6A and 11, four transverse braces 163 are added; they are placed between upper boom joints 99a and upper middle section frames 182a, two at the forward ends and two at the rear ends, of frames 182a. The ends of braces 163 join boom joint inner surface 186 and the inner face of frames 182, between the legs, and are welded thereto.

Turning to FIGS. 6D, rear boom joint middle frames 207b are placed to either side of center of lower frame 207a, leaving a gap between them of at least about five inches. One C-shaped end of each of middle frames 207b is joined to the upper of legs 212 by welding, with legs 212 of middle section 207b facing rearwardly.

Next, upper frame of rear boom joint 207a is added, the lower of its legs 212 joined to the top of the second C-shaped ends of middle frames 207b, and its C-shaped ends 211c abutting and joined to boom joint outer surface 187. Next, in FIG. 6C, angle brackets 149 are welded to the forward ends of frames 181a, 181c and boom joints 99a, 99b. Finally, sheeting 185 is joined to the outer surfaces of frames 181–184, preferably by riveting, and mast-head cover plate is added using bolts 155 fixed preferably to upper legs of frames 98 or upper boom joints 99a.

Turning to FIGS. 10 and 11, mast-head 14 is preferably supported by turntable 17. Mast-head plate 97 is mounted to reinforcement plate 157 below, and thence to upper plate 159. Reinforcement plate 157 distributes the load applied by upper plate 159. Turning to FIG. 16, turntable 17 is itself supported on mast 13 by lower plate 158 and rotary bearing assembly 160. Bearing assembly 160 has diameter d7, which is preferably about 30 inches and is suitable for supporting a load of about 40,000 pounds. Turntable 17 permits rotation of mast-head 14 relative to mast 13, and thus to transport body 8, and movement axis 5.

Figure 15:
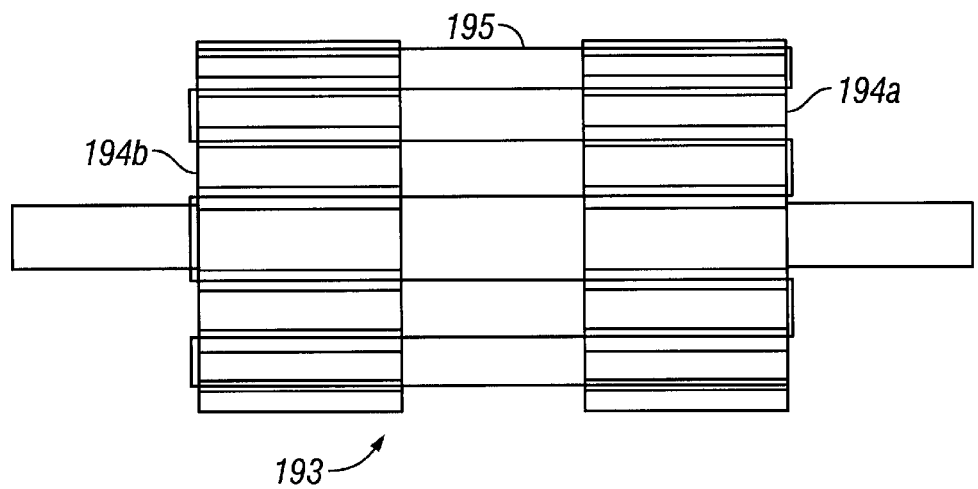
FIG. 15 depicts detail of the wire cage transmission.

Remaining with FIGS. 10 and 11, mast rotation motor 88, reducer 89 and 90-degree drive 90 are mounted within mast-head 14, to mast-head plate 97, either directly or indirectly. Motor 88 is joined to reducer 89 using a shaft, and preferably operates at about 1140–1180 R.P.M. Reducer 89 provides a reduced output shaft R.P.M., preferably a ratio of about 1:6000. Output speed of reducer 89 is preferably such that deploying of instrument boom 10 occurs at about 15 degrees per minute. Reducer 89's output shaft is joined to a wire cage coupling 193 (in FIG. 15), which comprises a cover, a first toothed transmission disk 194a, coupled to reducer 89, and offset a short distance along the shaft's axis, a second toothed transmission disk 194b, joined by a shaft to the input of 90-degree drive 90. Wire cage 195 is formed by tightly looping wire around the teeth of one transmission disk and around the teeth of the second, and repeating the process with other teeth, until each tooth is bound to one or more teeth with one or more loops of wire. Such a wire cage coupling 193 is advantageous because it provides a lower torque loss than a conventional rubber bushing, and little backlash. A model RK6-25N12 turntable bearing by Kaydon Corp., having an outer diameter of 29.5 inches, was found to be acceptable. A ½ H.P. SM-Cyclo 4000 electric motor was found to be acceptable for mast rotation motor 88. A Sumitomo model no. CHHJ4145DB4-7569 was found to be acceptable for reducer 89, and HUB CITY brand 90-degree drive, providing a 1:1 ratio, was found to be acceptable for drive 90.

Turning to FIGS. 11 and 16, drive 90 translates the output shaft rotation from coupling 193 to rotation in a second shaft in the vertical plane via a gearset (not shown). An output shaft from drive 90, passing through drive hole 161, is fixed to spur gear 196, which drives ring gear 197 fixed to lower plate 158 of turntable 17. As drive 90 is fixed to mast-head 14, and ring gear 197 to lower plate 158, and thence to chassis 6 via mast 13, operation of mast rotation motor 88 results in rotation of instrument boom 16. Rotation is permitted at least between the deployed position in FIG. 1C and the stowed position in FIGS. 2A and 2B. The deployed position in the preferred embodiment is about ten degrees rearward of a position normal to movement axis 5, while the stowed position is rearward and about thirteen degrees off movement axis 5.

Returning to FIGS. 1A and 1B, operator compartment 107, preferably located in the rearward portion of transport body 8, includes operator station 110, which permits an operator to control items such as instrument boom 10, emitter 112 and low-speed drive system 120. Drive system 120 may also be controlled by a driver in cab 4. Further equipment found in the preferred embodiment include video cameras 118 and worklights 119, which may also be operated from operator station 110.

Steady and slow forward movement of mobile inspection unit 1 along movement axis 5 (in FIG. 1A) is desirable for several reasons. First, in operation, a driver in cab 4 will control the direction of movement along movement axis 5 using a conventional, installed, steering system, just as along a roadway during normal movement. The driver or the operator at station 110 would operate low-speed drive system 120 to control the speed of inspection unit 1. In operation, side clearance 128 (in FIG. 1C) may be as little as 21 inches, depending upon the size of target 131 and the size of instrument boom 10. Thus, slow forward motion permits the driver to maintain this clearance more easily. Further, slow passage will increase the amount of time in which any particular portion of target 131 remains within scanning zone 114, increasing likelihood of detection of the sought after contraband or other items. In addition, accuracy is increased, as a smooth forward motion will minimize jerking associated with use of a conventional transmission of main drive system 3. Jerking would likely result in motion and flexure of instrument boom 10 relative to emitter 112, with resultant inaccuracies of detection based upon received signals. In a preferred embodiment, movement of instrument boom 10 relative to emitter 112, as measured at distal end 29a of lower boom segment 26 (visible in FIG. 1D), should be less than about one inch in any direction.

Turning to FIG. 2B, to permit such steady and slow forward movement, low-speed drive system 120 is preferred to power a rear set of wheels 7. Low-speed drive system 120 utilizes electric power from generator 102 to power electric motor 121. Motor 121 may run at up to 2000 RPM, and thus reducer 122 is used to reduce the rotational speed transmitted from the shaft of motor 121. From reducer 122, power is transferred, via transfer case 124, to reversed differential 123. Differential 123 converts rotation transverse to the axle of the shaft of reducer 122 to drive the rear set of wheels 7 of mobile transport 2, and is directed from the rear of wheels 7 in order not to interfere with main drive system 3. During operation, an operator at operator station 110, or the driver in cab 4 (both visible in FIG. 1A), can control the speed of motor 121 to propel mobile transport 2 at various speeds past a target 131; further, speed may be closely controlled because electric motor 121's speed may be adjusted up and down in small increments. These speeds may range from about 15 inch/second to about 60 inch/second. Transfer case 124 permits motor 121 and reducer 122 to be completely disengaged from reversed differential 123, permitting the rear set of wheels 7 to rotate freely during periods when mobile transport 2 is being propelled by main drive system 3. In the preferred embodiment, low-speed drive system 120 incorporates a conventional interlock preventing it from being engaged if main drive system 3 is engaged. Main drive system 3 similarly incorporates a conventional interlock to prevent it from being engaged if low-speed drive system 120 is engaged.

In order for mobile inspection unit 1 to most accurately inspect target vehicles or cargo, instrument boom 10 should provide a high degree of rigidity and torsional resistance. As discussed, rigidity and torsional resistance is important to maintain proper alignment between sensor packages 24 and emitter 112. Mast-assembly 12, particularly mast-head 14, and horizontal boom section 20, support much of the load applied by the sensors and the weight of instrument boom 10, both vertical and torque, and provide much of that rigidity.

Figure 6B:
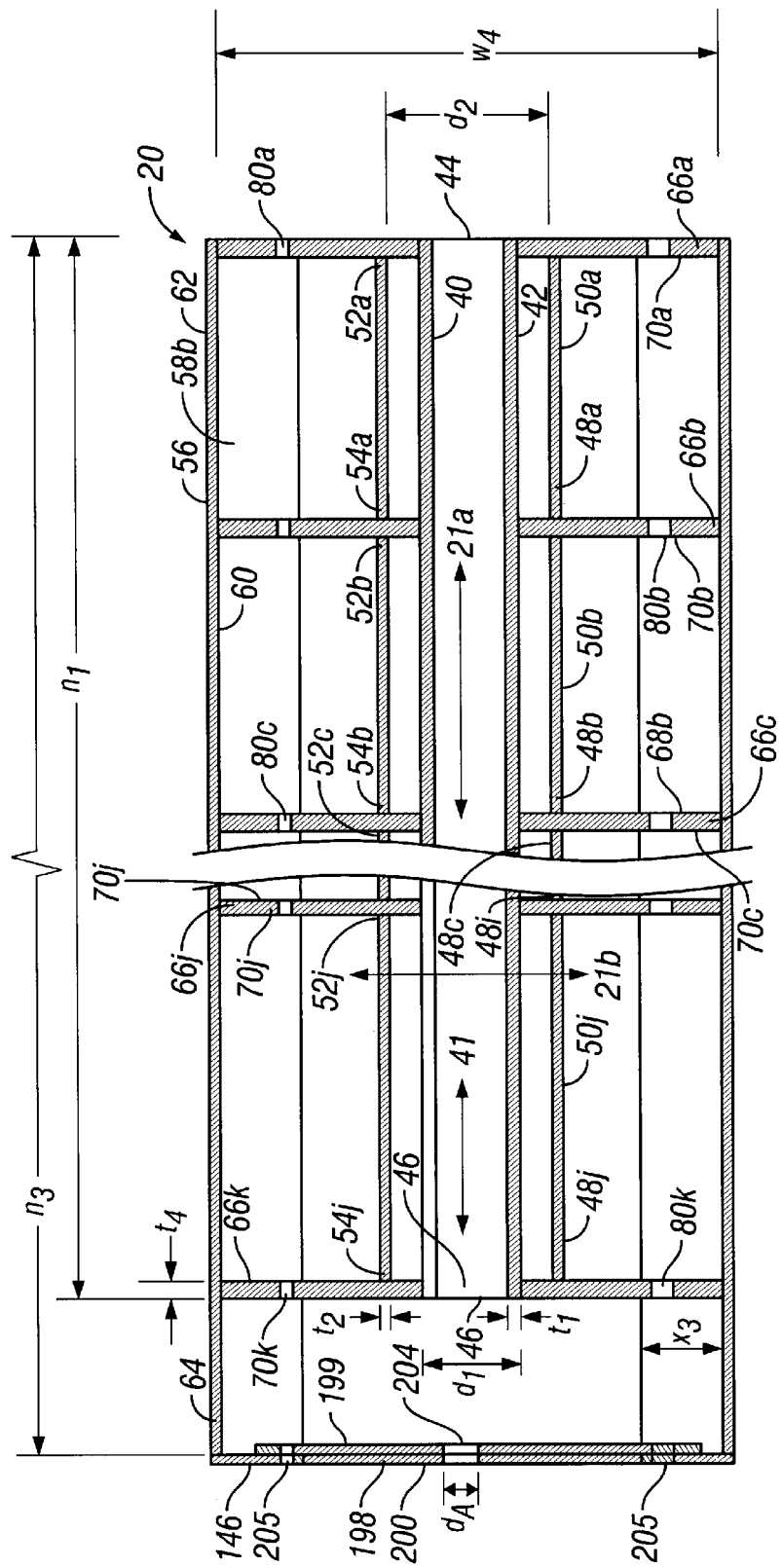
FIG. 6B depicts partial section E—E of the horizontal boom section.

Turning to FIGS. 6A and 6B, horizontal boom section 20 comprises longitudinal and transverse axes 21a, 21b, and a first support member, preferably inner tube 40, having outer surface 42, and longitudinal axis 41, proximal end 44 and distal end 46. Preferably, longitudinal axis 41 is coincident with axis 21a. Although the first support member is described and depicted as a hollow tube or cylinder, it could also be a solid rod; however a hollow tube has the advantage of providing additional torsional resistance compared to a solid rod of identical unit weight. Similarly, while inner tube 40 is depicted as being circular in cross section, it could also be oval or some other annular cross section. Further, the configuration will depend upon the specific materials utilized and the loads to be applied. In a preferred embodiment, inner tube 40 is formed as a hollow aluminum cylinder, having an annular cross-section, and an outer diameter d1, thickness t1 and length n1. In a particularly preferred embodiment, d1 is about 4 inches, t1 is about ½ inch, n1 is about 200 inches, and inner tube 40 is constructed of T6 6061 aluminum. While ANSI type T6 6061 aluminum has been found to be acceptable for tube 40, and for other components, other types of heat-treated or high-strength aluminum, or other metals may be acceptable depending upon the design criteria.

Figure 8A:
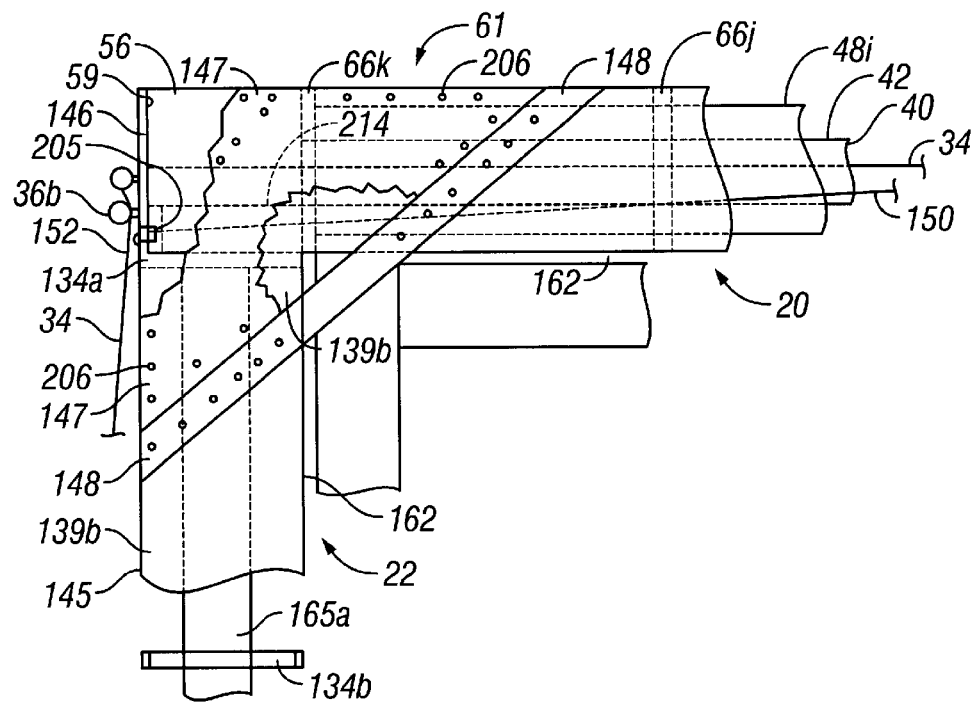
FIG. 8A is an elevation of the joint between horizontal and vertical boom sections.

Continuing with FIGS. 6A, 6B and 8A, horizontal boom section 20 also comprises a plurality of second support members, preferably eleven outer tube segments, 48a–48j; however the number and length of such segments may vary upwardly from one, and will depend upon the specific materials utilized and the loads to be applied. Outer tube segment 48a has surface 50a, proximate end 52a and distal end 54a. Similar features on outer tube segments 48a–48j are labeled utilizing those respective suffixes. Outer tube segments 48a–48j may be of a non-circular cross section, and may be of a different cross-sections or length from one another, however their inner dimensions must be larger than outer diameter d1 of inner tube 40. In a preferred embodiment, outer tube segments 48a–48j are formed as hollow aluminum cylinders, each having an annular cross-section, and an outer diameter d2 and thickness t2. Segments 48a–48j have lengths n2a through n2j, respectively. In a preferred embodiment, d2 is about 8 inches, t2 is about ½ inch, n2a through n2c are about 15½ inches, n2d is about 9½ inches, n2e through hn2i are about 23½ inches, and n2j is about 21½ inches. The number of segments, and their exact dimensions may vary, depending upon design criteria. In another embodiment, only nine segments are used, and lengths n2a through n2c are adjusted to compensate, preferably by increasing them to about 18½ inches. Preferably, outer tube segments 48a–48j are constructed of 6061 T6 aluminum, although other materials may be acceptable.

Figure 4:
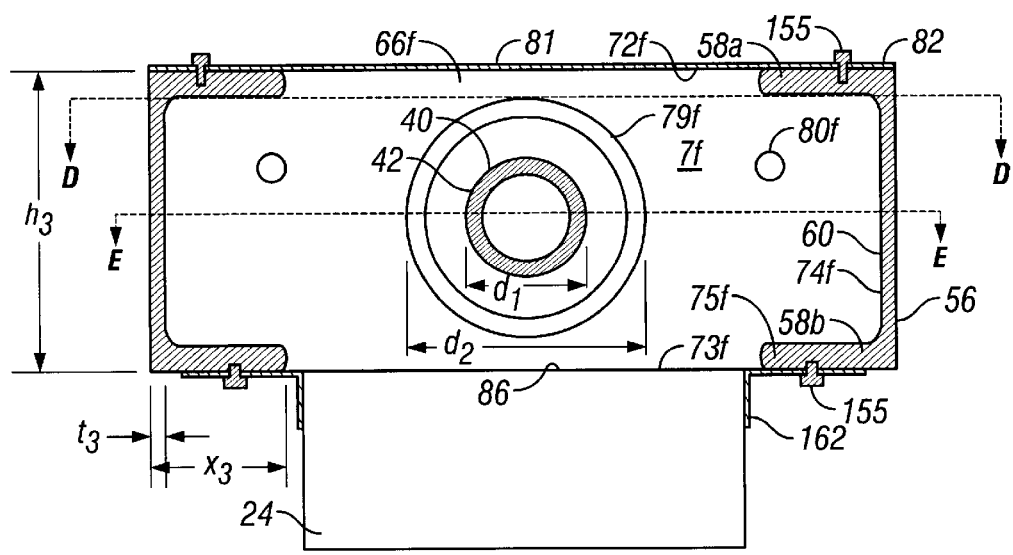
FIG. 4 depicts section C—C of the horizontal boom section.

Turning now to FIGS. 6A, 6B and 8, horizontal boom section 20 also comprises third support members, preferably beams 56, having one or more legs 58a and 58b, and inward surface 60. In a preferred embodiment, beams 56 are C-channel beams constructed of aluminum, and are also shown in FIG. 4. Also in this embodiment, inward surface 60 lies between legs 58a, 58b, which rise from the planar surface of beam 56, and run down its longitudinal axis. Beams 56 also have proximal end 62 and distal end 64. In this preferred embodiment, beams 56 have height h3, thickness t3 and legs 58a, 58b have depth x3. In this preferred embodiment, distal end 64 extends about 10 inches beyond flange 66K to facilitate box joint 59. In a particularly preferred embodiment, h3 is about 10 inches, t3 is about 0.5 inch, x3 is about five inches, n3 is about 210 inches, and beams 56 are constructed of 6061 T6 aluminum.

Figure 5B:
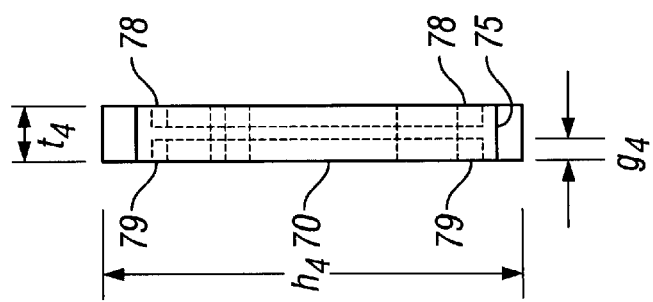
FIG. 5B is an edge view of a horizontal boom section flange.
Figure 5A:
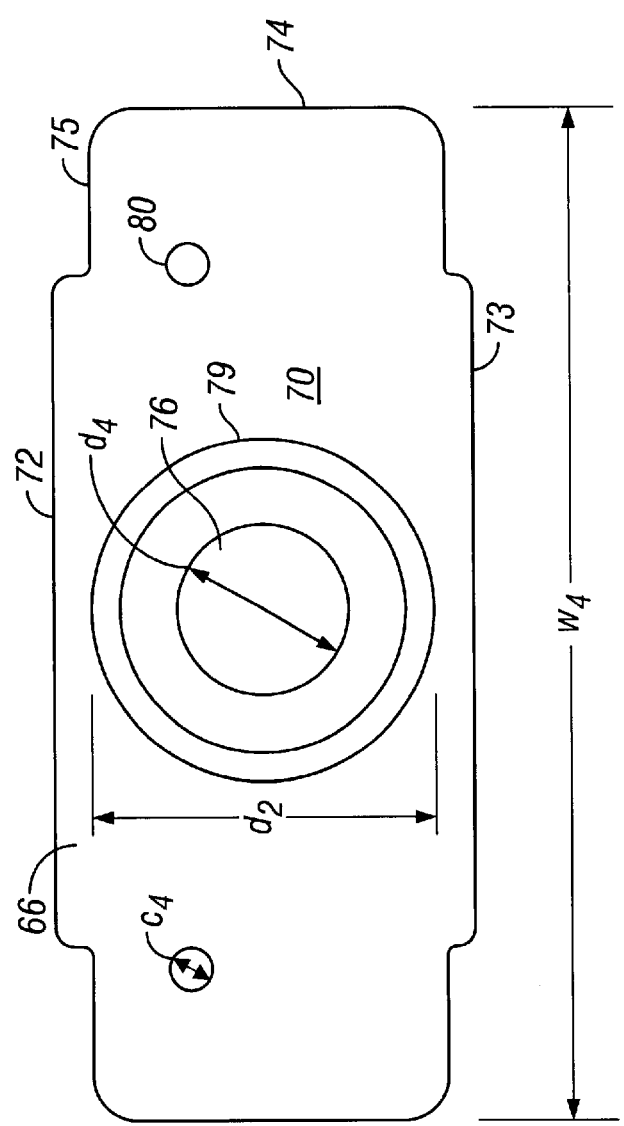
FIG. 5A is an elevation of a horizontal boom section flange.

Horizontal boom section 20 also comprises a number of HBS flanges 66, arrayed in a spaced relationship to one another. Referring to FIGS. 6A and 6B, in a preferred embodiment there are eleven HBS flanges 66a–66k. HBS flanges 66a and 66k may be referred to as end caps due to their terminal positions on horizontal boom section 20 and inner tube 40. Turning to FIGS. 4, 5A and 5B, HBS flange 66b includes proximal face 68b, and distal face 70b, as well as upper edge 72b, lower edge 73b and side edges 74b. HBS flange 66b also incorporates flange hole 76b which has flange hole edge 77b, and proximal and distal grooves 78b, 79b, located respectively upon proximal and distal faces, 68b, 70b. Grooves 78b, 79b are circular, and concentric to flange hole 76b, and correspond to the dimensions of outer tube segments 48. Grooves 78, 79 are preferably included, as they aid alignment of outer tube segments 48 during assembly and construction of horizontal boom section 20, however, they could be omitted, with the lengths of the outer tube segments reduced commensurately, and proximal and distal ends 52, 54 abutting directly upon faces 70, 68 of HBS flanges 66. Grooves 78b, 79b have an outer diameter corresponding to diameter d2, and the groove has a thickness corresponding to thickness t2. Further, grooves 78b, 79b have depth g4, from the face inward, sufficient to permit a corresponding distal end 54a of tube segment 48a or proximal end 52b of segment 48b to be inserted therein, and for the segments to be supported therein. In a preferred embodiment, d2 is eight inches, t2 is ½ inch and g4 is about ¼ inch.

HBS flange 66b also preferably includes channel cuts 75b, which, in one embodiment, are relatively shallow depressions formed in upper and lower edges 72b, 73b, about ¾ inch deep into the edges, and about four inches along the edges, and preferably closely conform to the shape of inward surface 60 and legs 58a, 58b of beams 56 to permit congruent engagement therewith. HBS flange 66b also incorporates two cable chases 80b permitting passage of tensioning cable 150. In a preferred embodiment, there are two cable chases, one each to the sides of flange hole 76b. In a preferred embodiment, HBS flange 66b is constructed of aluminum plate. Flange hole 76b and cable chases 80b can be removed by various machining processes for cutting thick metal pieces known to persons of skill in the art, such as a plasma cutter, or a water jet cutter. In this embodiment, HBS flange 66b has height h4, thickness t4 and width w4. Flange hole 76b has diameter d4, and cable chases 80b have diameter c4. In a particularly preferred embodiment, flange 66b is constructed of 6061 T6 aluminum, h4 is about 10 inches, t4 is about one inch, w4 is about 23 inches, c4 is about 1½ inches, and d4 is slightly greater than d1, about 4¹/₁₆ inches. HBS flanges 66a, 66c–66k have similar features labeled using those respective suffixes. HBS flange 66b will ordinarily be typical, save for the varying position of cable chases 80a–80k, but need not be. In addition, end caps 66a, 66k, which only adjoin one outer tube segment apiece, will ordinarily omit proximal groove 78a and distal groove 79k, respectively. Flange holes 76a–76k should be aligned to an axis coincident to axis 41. Returning to FIGS. 6A and 6B, in a particularly preferred embodiment, the spacing between the opposing distal and proximal faces of adjacent HBS flanges (e.g. a–b is between distal face 70a and proximal face 68b, preferably corresponding to a distance about ½ inch less than lengths n2a–n2j of outer tube segments 48a–48j) is as follows: a–b through c–d, about 15 inches; d–e, about 9 inches; e–f through j–k, about 23 inches. The number of flanges, and the spacing between them may vary, depending upon design criteria, such as the lengths of the outer tube segments. In another embodiment, only nine segments are used, and thus there are only ten flanges, in which case the spacing is adjusted to compensate.

To accommodate passage of tensioning cable 150 through each of flanges 66a–66k, as cable 150 moves downwardly and outwardly from proximal end cable attachment 151 to sheave 153 toward distal end cable attachment 152, each successive cable chase 80 is at a lesser height above the flange's lower edge 73 (visible in FIG. 8A). Tensioning cables 150 provide an upward force upon proximal and distal end attachment points 151, 152. Cables 150 are preferably ⅝ inch braided stainless steel cables, and are terminated by threaded studs, which in one embodiment, are about 1¼ inches in diameter, and may be secured by use of hardware known to a person of ordinary skill. The upward force is transmitted from those attachment points to rear frame 184 of mast-head 14 and to terminal flange 198 and ears 146 of vertical boom section 22.

Turning to FIGS. 10 and 11, sheaves 153, preferably used to redirect cables 150, cause the tension in cables 150 to act upwardly upon the structure at its ends. Sheaves 153 are located near the center of mast-head 14, preferably adjacent to access hole 156, and are supported by supports 154. Sheaves 153 are preferably about five inches in diameter, and supported upon a 1¼ inch bolt. Sheave supports 154 raise sheaves 153 above plate 97, and are preferably square tubing, having a four-inch hollow square section and ⅜ inch wall thickness, cut to about eleven inches long, onto which sheave 153 is mounted. The upward forces serve to reduce the "hogging" effect caused by supporting mast-head 14, counterweights 16, 19 and horizontal and vertical boom sections 20, 22 at an intermediate position, rather than at their ends. In addition, application of differing tension to cables 150 permits inducement of a "twist" of horizontal boom section 20 along its longitudinal axis. Such an induced twist may be used to counteract small misalignments of boom sections 20 and 22 during construction or otherwise. Tensioning cables 150 are internal to mast-head 14 and horizontal boom section 20, and are substantially horizontal, as sheaves 153 provide an upward deflection of about eleven inches above plate 97.

Returning to FIG. 4, horizontal boom section 20 preferably also includes upper HBS panels 81, which have edges 82. Preferably, HBS panels 81 are sufficiently wide to run from upper leg 58b of one beam 56 to upper leg 58b of the opposing beam 56, and together run the length of horizontal boom section 20. Panels 81 are mounted to legs 58b, preferably using bolts 155. Panels 81 provide access to the interior of horizontal boom section 20, protect the cabling and other components of the instrument boom 10, and are preferably made of about ⅛ inch aluminum sheet. Further, in a preferred embodiment, sensor packages 24 are mounted to brackets 162, preferably by welding, which are in turn mounted to the underside of legs 58b, preferably using bolts 155. Interior face 86 of sensor packages 24, and the interior of brackets 162 span the gap between legs 58a. In a preferred embodiment, sensor packages 24 and brackets 162 substantially cover the lower surface of legs 58a, and extend for substantially all of the portion of the underside of horizontal boom section 20 not covered by mast-head plate 97.

Horizontal boom section 20 is preferably assembled and joined by the following method. Joinder is preferably by MIG welding, as above. Referring to FIGS. 4 and 6B, prior to any welding, one of beams 56 is laid on the flat outer surface, with inward surface 60 and legs 58a, 58b facing upwardly. HBS flange 66a is aligned to proximal end 62, with side edges 74a of flange 66a abutting inward surface 60 and with upper and lower legs 58a, 58b congruently engaging channel cuts 75a. Next, flanges 66b–66k are placed with side edges 74b–74k abutting inward surfaces 60, and with upper and lower legs 58a, 58b congruently engaging channel cuts 75b–75k. Flanges 66b–66k, however, are not aligned to their final locations as indicated in FIGS. 6A, 6B, but rather are displaced about eight inches towards distal end 64 of beams 56, with flange 66k being located near distal end 64. Clamps may be used to retain flanges 66 in position.

Next, the second of beams 56 is aligned parallel to the first, with inward surfaces 60 facing one another, and placed on top of the exposed side edges 74a–74k. This beam 56 is fitted to the flanges, side edges 74a–74k abutting inward surface 60, and upper and lower legs 58a, 58b congruently engaging channel cuts 75a–75k. The entire assembly is then compressed, beams 56 pressed firmly onto channel cuts 75a–75k; again, clamps may be used to retain flanges 66 in position. This assembly is then turned so that is rests upon lower legs 58a and lower edges 73a–73k.

Remaining with FIGS. 4 and 6B, inner tube 40 is then inserted into flanges 66 at flange holes 76a–76k, starting at hole 76k. Surface 42, at proximal end 44 of tube 40, is aligned with hole 76k, and then pushed into it from distal face 70a. Once proximal end 44 has emerged from distal face 70a, outer tube segment 48j is interposed between flanges 66k and 66j, and inner tube 40 pushed therethrough. Tube 40 then reaches distal face 70b of the next flange 66j. Outer tube segment 48j is permitted to rest, or hang, loosely upon surface 42 of tube 40. This process is then repeated until proximal end 44 of tube 40 is substantially aligned to proximal face 68a, of end cap 66a.

Once in position, flange 66a is joined to surface 42 of inner tube 40. A weld bead is laid along the interface of flange hole edge 77a and surface 42 at either or both of proximal face 68a or distal face 70a. Flange 66a may now be welded to beams 56, first inward surface 60 of one of beams 56, welded to side edge 74a, and then the other, by applying a bead along the interface therebetween, on first proximal face 68a, then distal face 70a. Next, outer tube segment 48a is placed in a concentric position outside inner tube 40 (also visible in FIG. 8A), with proximal end 52a fitting into distal groove 79a on flange 66a. Next, the adjacent flange 66b is moved towards flange 66a from its displaced position, so that distal end 54a of segment 48a fits into proximal groove 78b on flange 66b. In this way, outer tube segment 48a is supported by the two adjacent flanges 66a, 66b by grooves 79a, 78b, and preferably fits therein the full ¼ inch depth. Next, edges 74b of flange 66b are partially welded to inward surface 60 at distal face 70, using one- or two-inch bead lengths. Next, ends 52a, 54a are preferably also partially welded, using one- or two-inch bead lengths, to distal face 70a and proximal face 68b to retain outer tube segment 48a in position. Partial welding of the HBS flanges and the outer tube segments permits some flex, or "give" so that should there be any need to adjust their alignment, or to adjust the alignment of the structure, that may more easily be done. Further, should the structure begin to bow due to the welding process, it also permits using a reverse welding sequence when finishing the weld to cancel out the bowing effect.

Continuing with FIG. 6B, flange 66b is joined to inner tube 40's surface 42. A weld bead is laid along the interface of flange hole edge 77b and surface 42 at distal face 70b, because proximal face 68b is covered by tube segment 48a. Then, repeating the above sequence, outer tube segment 48b is placed in a concentric position outside inner tube 40, with proximal end 52b fitting into distal groove 79b on flange 66b. Next, the adjacent flange 66c is moved towards flange 66b from its displaced position, enabling distal end 54b of segment 48b to fit into proximal groove 78c, and flange 66c and tube segment 48b are partially welded into position. This process is repeated for flanges 66d–66k, and for tube segments 66c–66j, sequentially welding the inner tube to a first flange, fitting a tube segment to the groove of the first flange, sliding the second flange into position and fitting its groove to the segment, and welding the flange and tube segment into place. Finally, end cap 66k is placed adjacent to tube segment 48j, and groove 78k fitted to end 54j. Distal face 70k of flange 66k will be aligned substantially to distal end 46 of tube 40, and will be about ten inches short of distal ends 64 of beams 56. Finally, the partial welds between HBS flanges 66 and beams 56, and between tube segments 48 and flanges 66 are filled in, completing the welds. A reversed welding sequence may be used to counteract bending due to welding, if needed. Naturally, this process could be accomplished in reverse order, beginning with placement of inner tube 40 into HBS flange 66a, or with the flanges initially displaced toward proximal end 62 of beams 56.

Next, proximal ends 52a–52j of outer tube segments 48a–48j are welded to distal faces 70a–70j, and distal ends 54a–54j are welded to proximal faces 70b–70k. Finally, flange 66b may now be welded to beams 56, inward surface 60 of one of beams 56, and then the other, welded to side edge 74b, by applying a bead along the interface therebetween, preferably on both of proximal face 68b and distal face 70b. This process may be repeated until both of beams 56 are welded to each of side edges 74a–74j. However, the sequence in which the edges are welded to the beams may be varied, such as by alternating edges, or by welding opposing edges first. Similarly, flanges 66 may be joined to beams 56 prior to welding outer tube segments 48 to flanges 66. The particular order may be affected by the need to counteract the effects of heat expansion, which may vary with ambient temperature. Next, referring to FIG. 4, panel 81 and brackets 162 are mounted using bolts 155.

Figure 3:
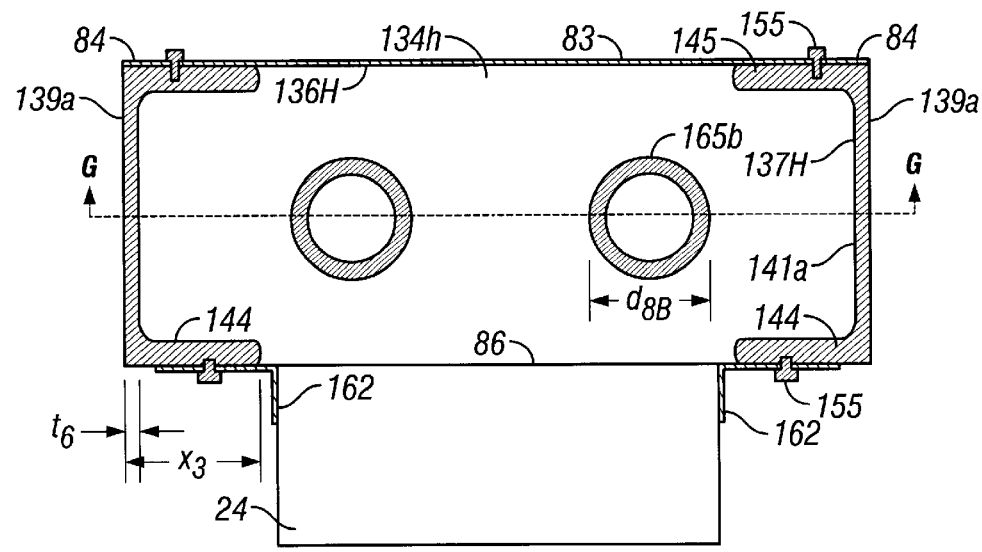
FIG. 3 depicts section B—B of the vertical boom section.
Figure 9:
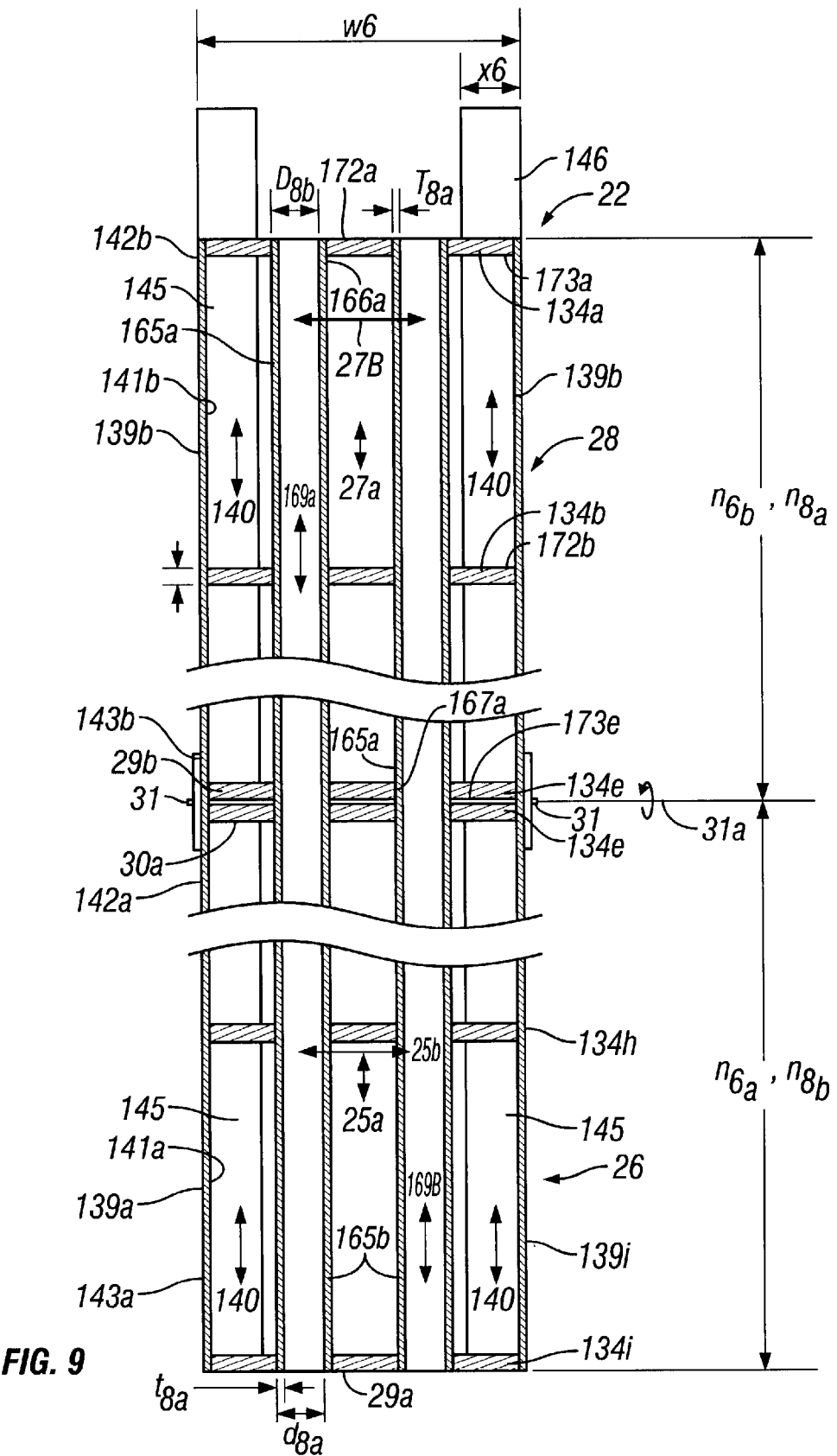
FIG. 9 depicts section G—G of the vertical boom section.

Vertical boom section 22 preferably comprises lower boom segment 26 and upper boom segment 28. Referring to FIGS. 3 and 9, segments 26, 28 preferably comprise longitudinal and transverse axes 25a, 25b and 27a, 27b, respectively. Upper boom segment 28 has distal and proximal ends 29b, 30b, and includes beam segments 139b, which have beam segment ears 146, longitudinal axes 140, inward surface 141a, proximal end 142a and distal end 143a. Lower boom segment 26 has distal and proximal ends 29a, 30a, and includes beam segments 139a, which have longitudinal axes 140, inward surface 141b, proximal end 142b and distal end 143b. Beam segments 139a, 139b may also have one or more legs, preferably inner leg 144 and outer leg 145. In a preferred embodiment, beam segments 139a, 139b are C-channel beams having inward surface 141 between legs 144, 145, which rise from the planar surface of beam segments 139a and 139b, and run down their longitudinal axes. In this preferred embodiment, beam segments 139a, 139b have width w6, thickness t6, inner and outer legs 144, 145 have depth x6, and beam segment 139b has length n6b. In this preferred embodiment, outer legs 145 of beam segments 139b are extended past VBS flange 134a to form ears 146. In a particularly preferred embodiment, w6 is about ten inches, t6 is about ½ inch, x6 is about five inches, and n6b is about 85 inches. Also in this embodiment, beam segment 139a, n6a, is about 84 inches, not including ear 146. However, beams 56 and beam segments 139a and 139b may also omit ears 146 used to construct box joint 59, by utilizing other methods of joining perpendicular beams known to persons of skill in the art. Beam segments 139a, 139b are preferably constructed of 6061 T6 aluminum.

Figure 1D:
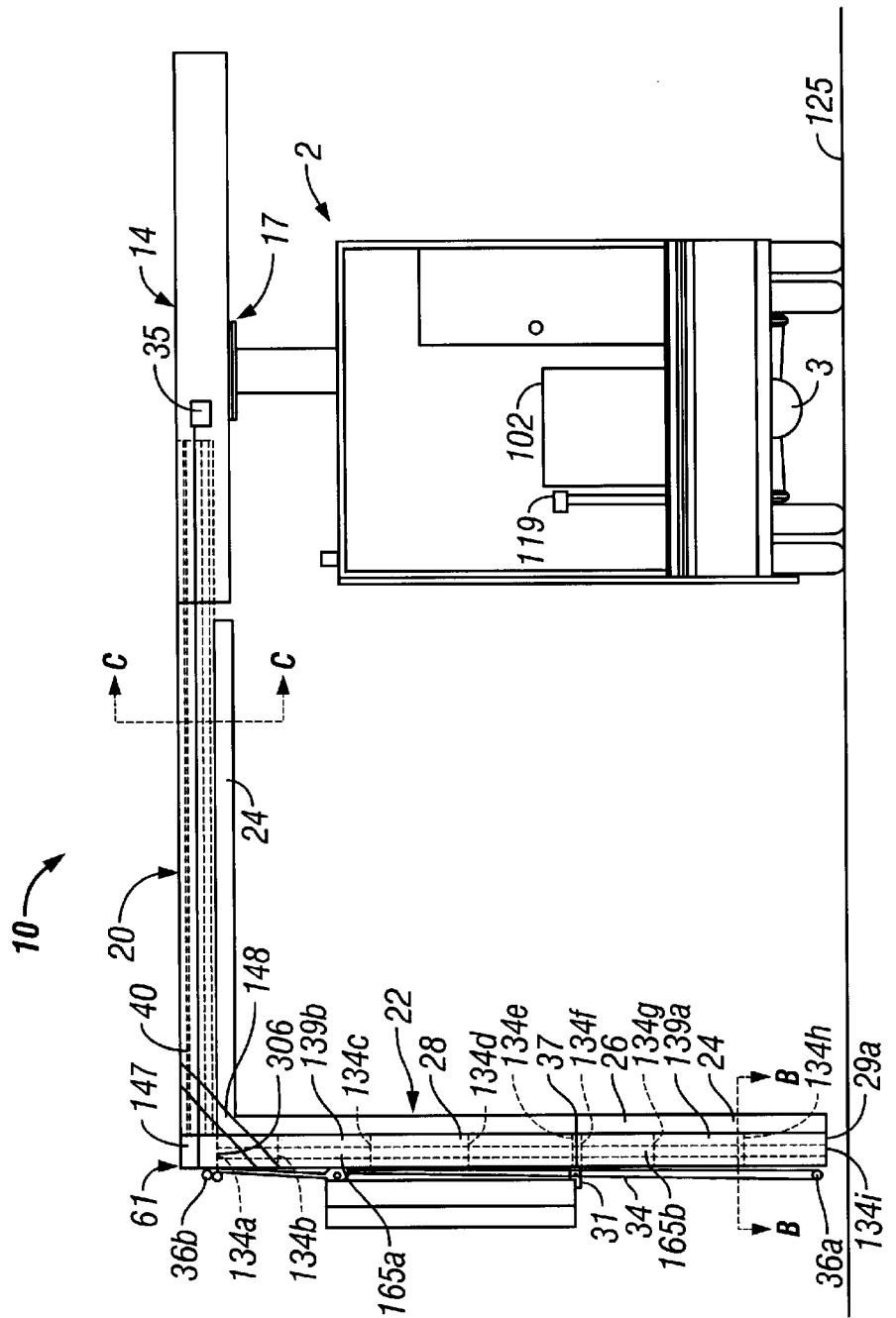
FIG. 1D is an end view of the mobile inspection unit depicting detail of the boom assembly in the deployed position.
Figure 7A:
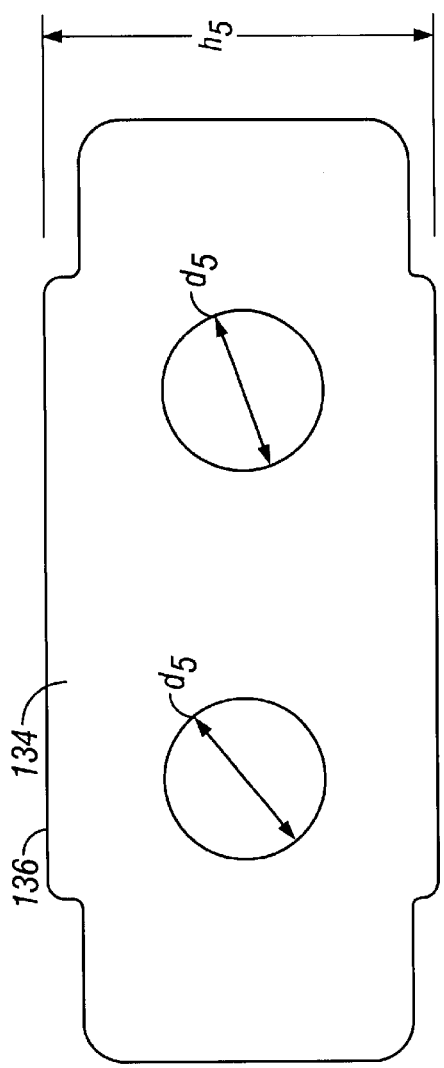
FIG. 7A is a top view of a vertical boom section flange.
Figure 7B:
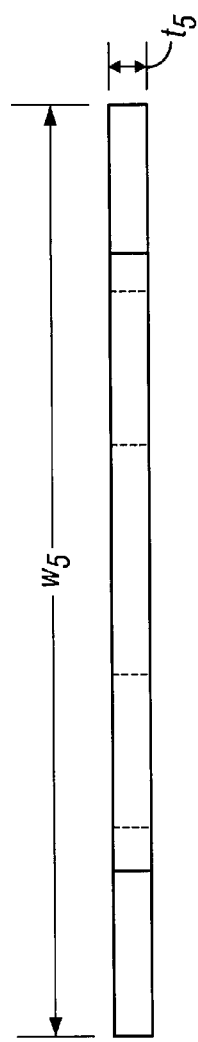
FIG. 7B is an edge view of a vertical boom section flange.
Figure 8B:
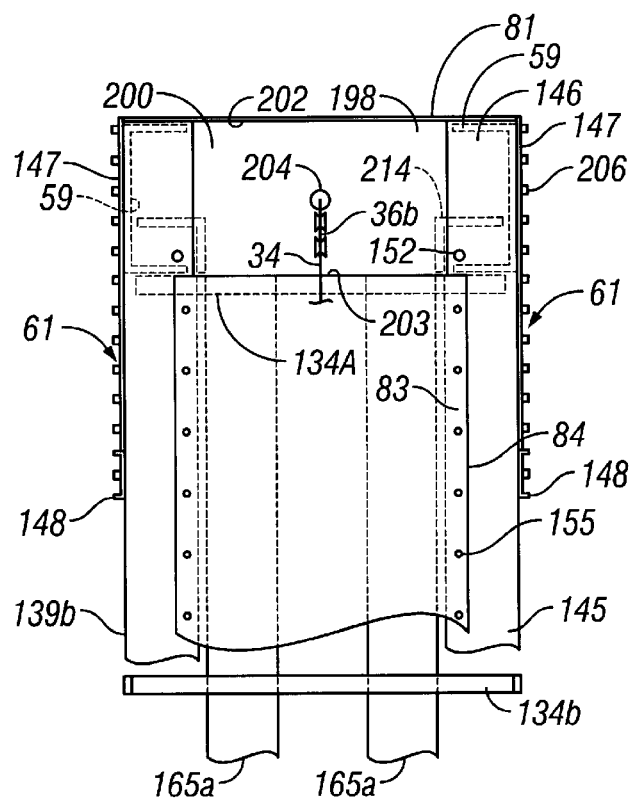
FIG. 8B is an end view of the joint between horizontal and vertical boom sections.

Referring to FIG. 9, upper and lower boom segments 28, 26 further comprise several VBS flanges 134, in a spaced relationship relative to one another (depicted in FIGS. 1D and 9). In a preferred embodiment, there are VBS flanges 134a–134i, the first five on upper boom segment 28, and the latter four on lower boom segment 26. Referring also to FIGS. 7A and 7B, VBS flange 134a includes outer edge 136a, inner edge 135a, side edges 137a, proximal face 172a and distal face 173a. VBS flange 134a further incorporates one or more flange holes 170a, flange hole edge 171a, and channel cuts 138a. In a preferred embodiment, channel cuts 138a are relatively shallow depressions formed in inner and outer edges 135a, 136a, about ¾ inch deep into the edges, and about four inches along the edges, and preferably closely conform to the shape of inward surface 141a, 141b and legs 144, 145 of beam segments 139a, 139b to facilitate congruent engagement therebetween (see FIG. 3). In a preferred embodiment, VBS flange 134a has two flange holes 170a, spaced apart, and is constructed of aluminum plate, as with HBS flanges 66. VBS flanges 134b–134i comprise similar elements labeled using those respective suffixes. Flange holes 170a–170i should be aligned parallel to axes 25a, 27a. Referring to FIGS. 8A, 8B and 9, in a preferred embodiment, in upper boom segment 28, flange 134a is located near proximal end 142b of beam segments 139b, but below ears 146, flange 134e is located at distal ends 143b, and flanges 134b–134d are spaced therebetween. Remaining with FIG. 9, similarly, on lower boom segment 26, flange 134f is located at proximal end 142a of beam segments 139a, and flange 134i is located at distal ends 143a, while flanges 134g, 134h are spaced therebetween. Turning to FIGS. 7A and 7B, in this embodiment, VBS flange 134a has height h5, thickness t5, width w5, and flange hole 170a has diameter d5. In a particularly preferred embodiment, VBS flange 134a is constructed of 6061 T6 aluminum, h5 is about nine inches, t5 is about one inch, d5 is about 4¹⁄₁₆ inches, and w5 is about 24 inches. Flange 134a will ordinarily be typical of VBS flanges 134a–134i, but need not be, which may differ depending upon design criteria for the segments. Returning to FIGS. 1D and 9, in a particularly preferred embodiment, the spacing between the opposing distal and proximal faces of adjacent VBS flanges (e.g. a–b is between distal face 173a and proximal face 172b) is as follows: a–b through d–e, about 23.5 inches; and f–g through h–i, about 22 inches. VBS flanges are spaced enough to accommodate hinge 31.

Referring to FIGS. 3 and 9, upper and lower boom segments 28, 26 each further comprise one or more upper and lower vertical tube segments 165a, 165b, respectively, and in a preferred embodiment, two each. Vertical tube segments 165a, 165b, as with inner tube 40, are described and depicted as hollow tubes, however, other shapes or cross-sections may be suitable, such as a solid rod, depending upon the design. Upper vertical tube segments 165a have proximal end 166a, distal end 167a, surface 168a and longitudinal axis 169a. In a preferred embodiment, vertical tube segments 165a are formed as hollow aluminum cylinders, having an annular cross-section, and outer diameter d8a, thickness t8a and length n8a. In a particularly preferred embodiment, d8a is about 4 inches, t8a is about ½ inch, and n8a is about 98 inches, and inner tube 40 is constructed of 6061 T6 aluminum. Tube segments 165b have similar features labeled with the suffix b, and while upper tube segments 165a are ordinarily typical, they may differ based upon design criteria; in addition, in a preferred embodiment, n8b is shorter than n8b, and is about 70 inches. Also in a preferred embodiment, axes 169a, 169b are parallel to upper and lower boom segment axes 27a, 25a.

Remaining with FIG. 3, vertical boom section 22 preferably also includes outer VBS panels 83, which have edges 84. Preferably, VBS panels 83 are sufficiently wide to reach between opposing legs 145 of each of beam segments 139a and 139b, and together run the length of vertical boom section 22. Panels 83 are mounted to legs 145, preferably using bolts 155. Panels 83 provide access to the interior of vertical boom section 22 and protect the cabling and other components of the instrument boom 10, and are preferably made of about ⅛ inch aluminum sheet. Further, similarly in a preferred embodiment, sensor packages 24 are mounted to brackets 162, preferably by welding, which are in turn mounted to the underside of inner legs 144 of each of beam segments 139a and 139b, preferably using bolts 155. In a preferred embodiment, interior face 86 of sensor packages 24 and brackets 162 substantially cover the exterior surface of legs 144, and have a small gap located at the junction between flanges 134e and 134f.

Vertical boom segments 26, 28 are preferably constructed in the following fashion, using tools described above for horizontal boom section 20. Referring to FIGS. 3 and 9, for upper boom segment 28, prior to any welding, an assembly process similar to horizontal boom section 20 occurs. One of beam segments 139b is laid on the flat outer surface, with inward surface 141b and legs 144, 145 facing upwardly. Proximal face 172a of VBS flange 134a is substantially aligned to proximal end 142b of beam segment 139b, with ears 146 extending beyond flange 134a. Side edges 137a of flange 134a abut inward surface 141b and inner and outer legs 144, 145 congruently engage channel cuts 138a. Next, flanges 134b–134e are similarly placed between inner and outer legs 144, 145, with side edges 137b–137e abutting inward surface 141b and with inner and outer legs 144, 145 congruently engaging channel cuts 138b–138e. Distal face 173e of flange 134e is substantially aligned to distal ends 143b of beam segments 139b. Clamps may be used to retain flanges 134 in position. Next, the second of beam segments 139b is aligned parallel to the first, with inward surfaces 141b facing one another, and placed on top of the exposed side edges 137b–137e. This beam 139b is fitted to the flanges, side edges 137b–137e abutting inward surface 141b, and inner and outer legs 144, 145 congruently engaging channel cuts 138a–138e. The entire assembly is then compressed, beam segments 139b pressed firmly onto channel cuts 138a–138e; again, clamps may be used to retain flanges 134 in position. This assembly is then turned so that is rests upon inner legs 144 and inner edges 135a–135e.

Next, remaining with FIGS. 3 and 9, one of upper tube segments 165a is aligned with one of the set of flange holes 170a–170e, and inserted therein. Once fully inserted, proximal end 166a substantially aligns with proximal face 172a of VBS flange 134a, and distal end 167a substantially aligns with distal face 173e of VBS flange 134e. This process is repeated for the second of tube segments 165a and flange holes 170a–170e. Next, inward surfaces 141b of beam segments 139b are preferably tack welded, or clamped, at several points to side edges 137a, and then similarly for side edges 137b–137e, until inward surface 141b is abutting and aligned to each of the opposing side edges 137a–137e. Clamping or tack welding permits some flex, or "give" so that should there be any need to adjust the alignment of the structure, this may more easily be done.

Next, both of upper tube segments 165a are preferably removed from the structure in order to permit more room for access by a welder, and once all items are in alignment, inward surface 141b of one of beam segments 139b is welded to side edge 137a, by applying a bead along the interface therebetween on first proximal face 172a, then distal face 173a. This process is repeated for the second of beam segments 139b, joining it to the second side edges 137a. This process is then repeated for side edges 137b–137e, for both of beam segments 139b. The order in which the side edges are joined to beam segments 139b may be altered, for instance by joining all side edges to one beam segment first, or by starting from VBS flange 134e, or in some other order. If upper tube segments 165a were removed from the structure, they may be replaced now. Then flange 134a is joined to one of upper tube segments 165a by laying a weld bead along the interface of flange hole edge 171a and surface 168a at one or both of proximal and distal faces 172a, 173a of flange 134a. This process is repeated for each of flanges 134b–134e, and then for the second of upper tube segments 165a. The sequence in which the flanges are welded to tube segments may be varied, such as by alternating tubes, and completing each flange before continuing to the next.

Remaining with FIGS. 3 and 9, for lower boom segment 26 this process is repeated with beam segments 139a. One of beam segments 139a is laid on the flat outer surface, with inward surface 141b and legs 144, 145 facing upwardly, and flange 134f is set therein. VBS flange 134f, an end cap, is substantially aligned to proximal end 142a, with inward surface 141a abutting side edge 137f and with inner and outer legs 144, 145 congruently engaging channel cuts 138f. VBS flanges 134f–134i are placed similarly, as in upper boom segment 28. VBS flange 134i, an end cap, is substantially aligned to distal end 143a. Similarly, one of lower tube segments 165b is aligned with one of the set of flange holes 170f–170i, and inserted therein. Once fully inserted, proximal end 166b substantially aligns with proximal face 172f of VBS flange 134f, and distal end 167b aligns with distal face 173i of VBS flange 134i. This process is repeated for the second of tube segments 165a and flange holes 170f–170i. A similar welding process is then carried out as in upper boom segment 28, preferably with tube segments 165b having been removed during welding of flanges 134.

Turning to FIG. 9, upper boom segment 28 and lower boom segment 26 are joined at their respective distal and proximal ends, 30a, 29b, preferably by hinge 31, which is preferably located between VBS flanges 134e, 134f, adjacent to outer edges 136e, 136f. Hinge 31 permits a range of motion of lower boom segment 26 relative to upper boom segment 28, preferably at least about 180 degrees about hinges 31's axis of rotation 31a. This range of motion is shown in FIG. 1D. Axis of rotation 31a preferably runs parallel to outer edges 136e, 136f.

Turning to FIGS. 1D and 6A, the lower boom section stowage system comprises hinge 31, cable 34, winch 35, sheaves 36a, 36b and latches 37. Latches 37 have open and closed positions, and are also located adjacent distal and proximal ends, 30a, 29b, preferably on distal end 143b of beam segment 139b and proximal end 142a of beam segment 139a, on the sides of beam segments 139a, 139b. Latches 37 are heavy duty, preferably 8,000-pound, stainless steel locking clamps, suitable for bolting to the sides of beam segments 139a, 139b. Latches 37 also preferably have locking pins, to prevent accidental opening of the latch. A KNU-VISE brand PC-8000-SS clamp by Lapeer Manufacturing, Lapeer Mich., 48446 was found to be acceptable. In a closed position, latches 37, in coordination with hinges 31, hold flange 134f of lower boom segment 26 in a close relationship with flange 134e of upper boom segment 28, and maintains a rigid connection therebetween. This provides the down position of vertical boom section 22. In an open position, latches 37 permit inner edge 135f of flange 134f to move arcuately and away downwardly from edge 135e of flange 134e, permitting lower boom segment 26 to rotate about axis 31a of hinges 31.

Referring to FIGS. 1D and 9, in one embodiment, hinges 31 are sets of knife hinges, one set each mounted to each side of vertical boom section 22, at the point at which flange 134e and flange 134f abut, and proximate to outer legs 145 of beam segments 139a, 139b. The pin in knife hinges 31 is aligned to create axis 31a, which in this embodiment, is about three inches outward of outer legs 145. Knife hinges offer the advantage that they are self-aligning, in axis 31a, and offer a more precise and repeatable positioning of lower boom segment 26 relative to emitter 112. In another embodiment, hinge 31 is at least one piano hinge, having axis 31a, which is mounted to the outer faces of upper and lower boom segments 28, 26, at the point at which flange 134e and flange 134f abut.

Referring to FIG. 1C, stow cable 34, used in the stowage system, is used to raise and fold back the lower boom section, and is preferably rigged in a double line pull configuration, in order to reduce winch power requirements. Stow cable 34 is directed by, and accomplishes stowage by acting at sheaves 36. Sheaves 36 are stainless steel, V-shaped, wire cable sheaves, of about three inch diameter. Lower sheave 36a is located near distal end 29a of lower boom segment 26, and near outer edge 136i of VBS flange 134i, on the outer surface of the boom segment, and is preferably set a small distance off that surface to facilitate passage of cable 34 about sheave 36a. First and second upper sheaves 36b are located on distal face 200 of terminal flange 198, and are also set a small distance off that surface to facilitate passage of cable 34. The second upper sheave 36b is set below the first, approximately 24 inches. Cable 34 should be a braided steel cable suitable for use on a winch, and be sufficiently long to reach from proximal end 30b sheave 36a, back to proximal end 30b, and then to winch 35 (in FIGS. 1D and 6A). In a preferred embodiment, its length is about fifty feet long and its diameter about 3/16 inch. One end of stow cable 34 is fixed to the outer surface of upper vertical boom segment 28, at a point slightly below the position of lower sheave 36a, when lower boom segment is in the stowed position. In the stowed position, cable 34 passes downwardly, outward of boom segments 26 and 28, and adjacent to outer panels 83, and approaches sheave 36a from its interior side, and wraps around sheave 36a, and is redirected upwardly from the exterior side of sheave 36b. Cable 34 then passes upwardly, outward of the above length, and approaches second upper sheave 36b from its interior side, and passes to the outward side of first upper sheave 36b. After being redirected toward horizontal boom section 20, and turning to FIGS. 8A and 8B, cable 34 enters instrument boom 10 through cable chase 204 in distal face 200 of terminal flange 198. Referring to FIG. 6B, cable 34 then enters horizontal boom section 20 at distal end 46 of inner tube 40, which is open at HBS flange 66k, and, in FIG. 6D, leaves it at proximal end 44, at flange 66a. Cable 34 then passes between upper and lower frames 207a, 207c of rear frame 207. Cable 34 then reaches winch 35, which is mounted to the interior of mast-head 14, and in one embodiment above, and indirectly to, mast-head plate 97.

Referring to FIGS. 1C and 1D, with latch 37 in an open position, winch 35 draws in cable 34, which applies an upward force upon distal end 29a at sheave 36a, causing end 29a to swing upwardly and outwardly on hinges 31. As end 29a swings out, cable 34 exerts an upward and inward force. Continuing, as end 29a continues upward, outer panels 83 will reach a position approximately level with ground 125. As cable 34 continues to be drawn in, end 29a will approach outer panels 83 on upper boom segment 28, and hinges 31 will approach their 180 degree extension. Finally, in the stowed position, hinges 31 are at about 180 degree extension, outer edge 136i of flange 134i is near upper boom segment 28, and the outer panels of 83 of boom segment 26 are about three inches outward of those on boom segment 28, due to the location of axis 31a. FIG. 2B depicts the fully stowed position. In the stowed position, lower boom segment 26 and its longitudinal axis 25a is substantially collinear with upper boom segment 28 and its longitudinal axis 27a.

Figure 18:
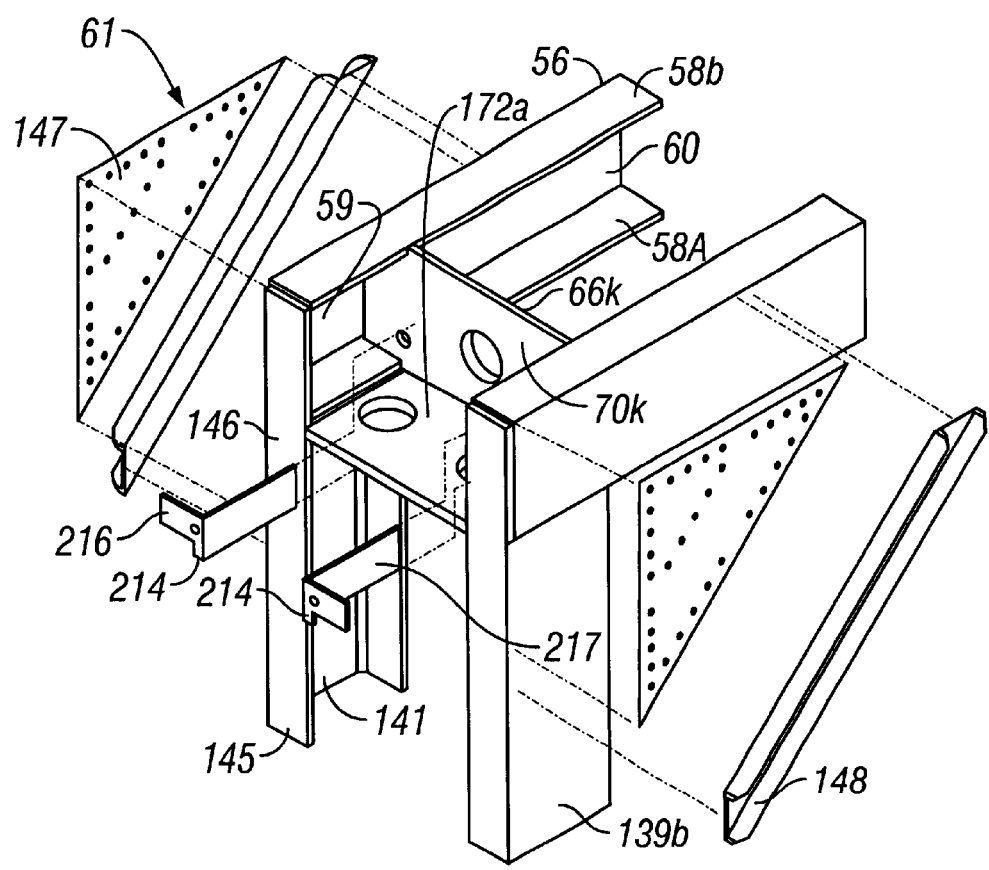
FIG. 18 is an exploded view of the joint between horizontal and vertical boom sections.

Turning now to FIGS. 8A, 8B and 18, horizontal boom section 20 and vertical boom section 22 are preferably joined by box joint 59 and gusset assembly 61. Box joint assembly 59 is preferably constructed as follows. Ears 146 on upper beam segment 139b extend across the C-shaped distal ends 64 of horizontal beams 56. The inner surfaces of ears 146 closely abut distal ends 64, which extend beyond end cap flange 66k. Ears 146 and beams 56 are joined by welding; in one embodiment, C-shaped distal ends 64 are welded about at the joint with ears 146 on upper leg 58b and the side of beams 56, and at the inner periphery of lower leg 58a. In a further embodiment, inner edge 135a of end cap flange 134a is welded to lower edge 72k of end cap flange 66k, but solely on the inside of instrument boom 10. In addition, proximal ends 142b of beam segments 139b, save for ears 146, closely abut the lower surface of lower legs 58a and are welded thereto, preferably along the outer periphery of inner leg 144 of beam segment 139b, and along the side of beam segment 139b. The structure is preferably held tightly together during the welding process, such as by using clamps and other supports, to prevent deformation of the joints due to heat expansion. The welds may be accomplished in various orders, however, joining ears 146 to beams 56, one at a time, and then joining proximal end 142b to beams 56 was acceptable. It is important to maintain a 90-degree angle between horizontal and vertical boom sections 20, 22, in order to obtain accurate scanning results. Altering the order of welding to counteract results of heat expansion may be necessary and may further depend upon ambient environmental conditions. Exposed welds are preferably substantially flush with the outer surfaces of beams 56 and beam segment 139b to facilitate joining gusset assembly 61 to horizontal and vertical boom sections 20, 22.

Remaining with FIGS. 8A, 8B and 18, gusset assembly 61 preferably includes gusset plates 147, gusset channel beam 148 and bolts 206. Plates 147 are metal plates, preferably triangular pieces of T6 6061 aluminum, ¼ inch thick, having one right angle and two sides of at least about 20 inches, and preferably about 22–26 inches, adjacent to the right angle. Gusset channel beams 148 are sections of 3" C-channel beam about ¼ inch thick, also preferably T6 6061 aluminum, cut to run adjacent to the edges of plates 147, opposite to the right angle. The long, outward face of beams 148 abuts the outer surfaces of beams 56 and 139b. Beams 148 are preferably about 30 to about 40 inches in length, preferably extending fully diagonally across beams 56 and beam segments 139b. Plates 147 are located with the right angle placed at the intersection of upper legs 58b and ears 146, and the adjacent legs running downwardly and inwardly along the edges of outer legs 145 and upper legs 58b. Plates 147 are preferably joined to beams 56 and beam segment 139b using structural bolts 206. An acceptable bolt pattern includes about nine along each adjacent side, about ten along the opposite side, and five further extending from side to side at intermediate points along each side. Beams 148 are also preferably joined using bolts 206, six bolts each joining the beams to beam 56 and beam segment 139b being acceptable.

Turning to FIGS. 8B and 9, preferably, a terminal flange 198 is located between ears 146 of upper beam segment 139b. Terminal flange 198 is a further flange, in line with HBS flanges 66a–66k, but not joined to inner tube 40 or outer tube segments 48a–48j. Flange 198 serves primarily as a point of attachment for tension cable distal end points 152, and to block off the open space between the distal ends of beams 56. Turning to FIGS. 13A and 13B, in one embodiment, flange 198 is a single plate; in another it is a composite plate, comprised of two to about four thinner plates, welded together face-to-face (seen in FIG. 6B). Flange 198 includes proximal and distal faces 199 and 200, side, top and bottom edges 201, 202 and 203, tension cable chases 205 and stow cable chase 204. Turning to FIGS. 6B and 8A, tension cable chases 205 are aligned with cable chases 80a–80k in the HBS flanges 66, and, in FIG. 13A, have a diameter c9, while stow cable chase 204 is slot-shaped, and aligned with distal end 46 of inner tube 40. Flange 198 is cut to fit within the gap (see FIG. 9) created between VBS flange 134a and ears 146, and has width w9 along top and bottom edges 202, 203, height h9 along side edges 201, and thickness t9 between faces 199, 200. In an embodiment using composite plate flange 198 (see FIG. 6B), inner plates, near proximal face 199, have a width w9 greater than those of outer plates, near distal face 200, in order that the longer plates overlap ears 146, and the shorter plates fit between ears 146.

Turning to FIGS. 8A, 8B and 18, two braces 214 are preferably used to make box joint 59 more rigid, and to reinforce terminal flange 198 where cable 150 applies tension at attachment points 152. Each of braces 214 include forward ends 217 and rear plates 216, and is generally "L"-shaped viewed from above, with the long side being forward end 217. The vertical portion of forward ends 217 abut distal face 70k of end cap flange 66k, and the bottom side abutting end cap flange 134a, and is situated slightly inwardly of legs 58a and 144. Rear plate 216 extends outwardly from forward end 217, with its vertical portion abutting inward surface 60, and its bottom side notched to accommodate rear plate 216 abutting the inner surface of lower leg 58 of beam 56, and end cap flange 134a. Rear plate 216 has 1½ inch holes therethrough to permit passage of the studs of cable 150, and is joined by welding to proximal face 199 of terminal flange assembly 198, to inward surface 60 of beams 56, and to legs 58a. Forward end 216 is welded to end caps 134a, 66k.

Returning to FIGS. 13A and 13B, in one preferred embodiment h9 is about 10 inches, w9 is about 15–16 inches, t9 is about one inch, stow cable chase 204 is about 1¼ inches by about 2½ inches, and c9 is about 1¼ inches. In another preferred embodiment, a composite flange 198 includes four plates, each having thickness t9 of about ¼ inch, and having widths of 15–16 inches and about 20–22 inches. Flange 178 is preferably T6 6061 aluminum. Referring to FIG. 8A, in one embodiment, it is joined by welding side edges 201 to the inner edges of ears 146, and bottom edge 203 to outer edge 136 of flange 134a. Turning to FIG. 6B, in a composite terminal flange 198, side edges 201 of narrower plates are welded to the inner edges of ears 146, while wider plates overlap, and are welded to the inner face of ears 146, and bottom edge 203 is welded to outer edge 136 of flange 134a.

Referring to FIG. 1C, sensor packages 24 comprise a significant portion of the load borne by horizontal and vertical boom sections 20, 22, and total about 1800 pounds. This weight is roughly evenly split between the two sections, with about a 9/11 split between horizontal boom section 20 and vertical boom section 22.

Figure 17B:
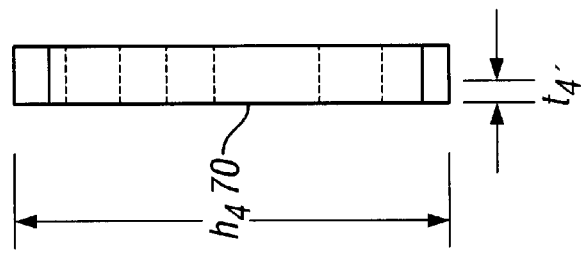
FIG. 17B is an edge view of an alternative horizontal boom section flange.
Figure 17A:
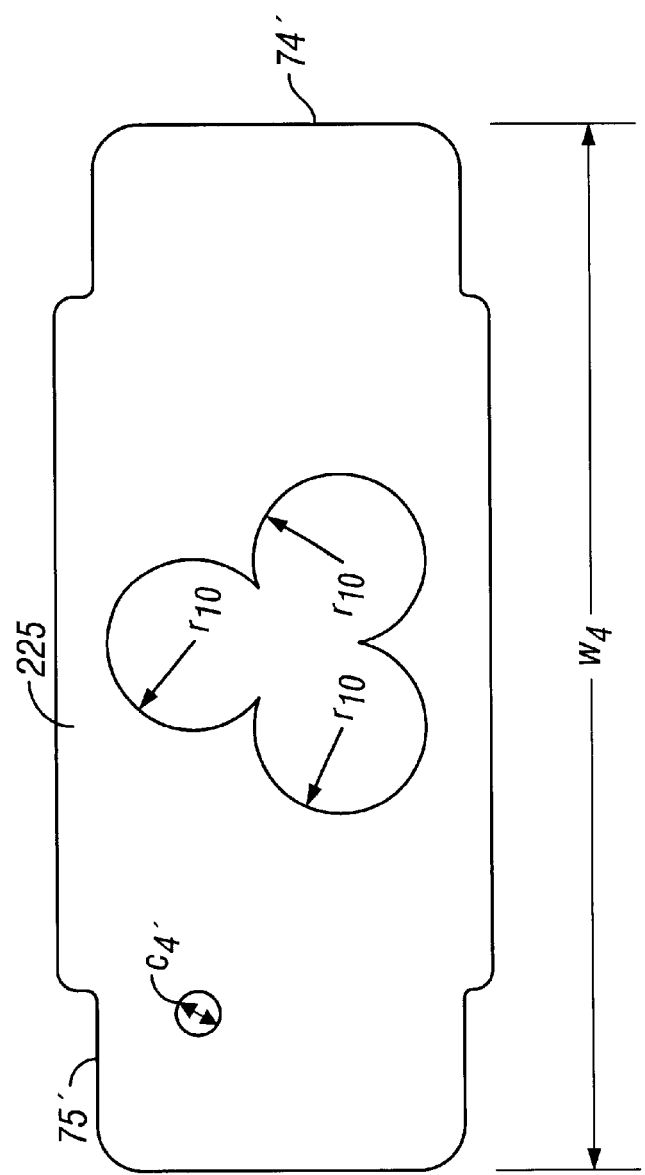
FIG. 17A is an elevation of an alternative horizontal boom section flange.
Figure 17C:
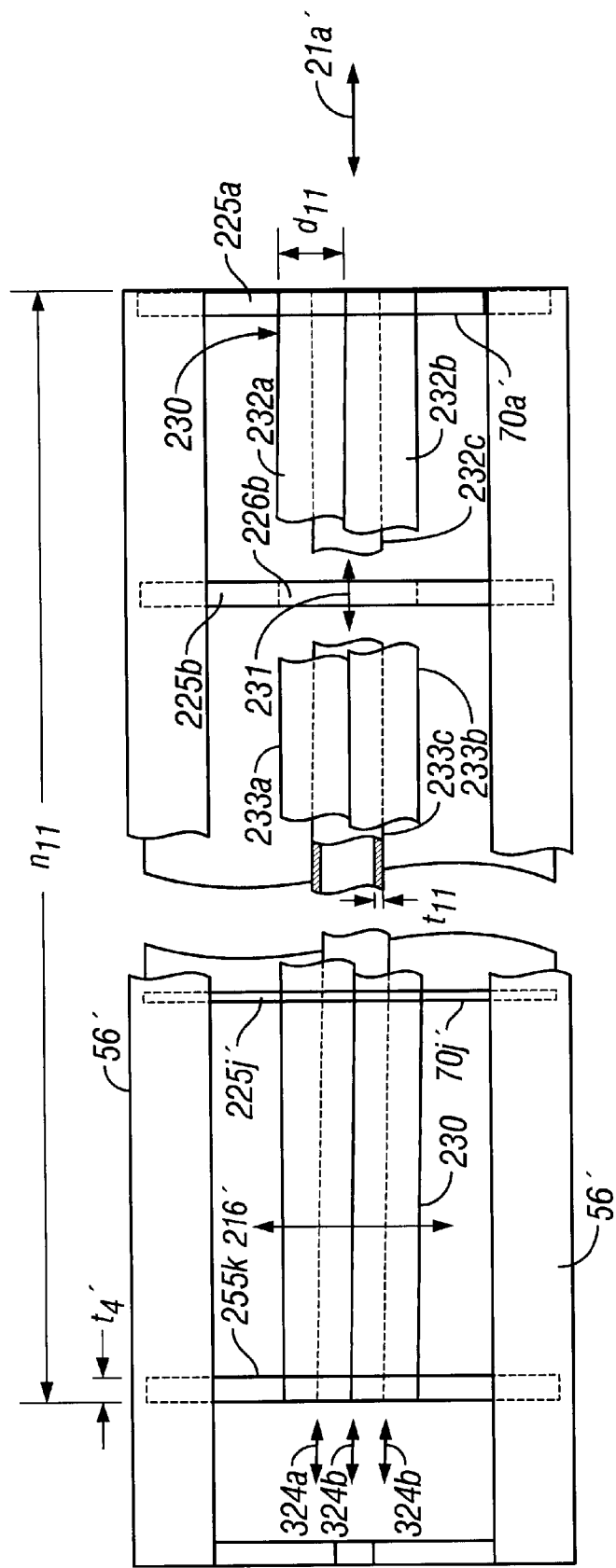
FIG. 17C is a partial cutaway bottom view of alternative horizontal boom section.

In an alternative embodiment, in horizontal boom section 20', inner tube 40 and outer tube segments 48a–48j and HBS flanges 66a–66k are replaced by structures depicted in FIGS. 17A, 17B and 17C. This alternative structure can offer both advantages in weight reduction by utilizing thinner-walled tubes in the horizontal boom section and in construction time by utilizing a simpler construction method. This alternative horizontal boom section 20' utilizes several components similar to those in section 20, and these components having the same or nearly the same components and functions will be identified by use of a prime, thusly—'—. Referring to FIG. 17C, horizontal boom section 20' comprises a first support assembly, preferably treble tube assembly 230, longitudinal and transverse axes 21a', 21b', second support members, preferably beams 56', and a number of trilobe flanges 225, arrayed in a spaced relationship to one another, similar to the relationship depicted in FIG. 6A for HBS flanges 66, and as in FIG. 17C. Boom section 20' also comprises upper HBS panel 81'. In a preferred embodiment, there are eleven trilobe flanges 225a–225k. Referring to FIGS. 17A and 17B, flange 225a comprises trilobe flange hole 226a, flange hole edge 227a, proximal face 68a', distal face 70a', upper, lower and side edges 72a', 73a' and 74a', channel cuts 75a' and cable chases 80a'. Trilobe flange hole 226a is shaped roughly in the form of three circles of equal radius, arranged such that their centers form an equilateral triangle having a point facing downwardly and the opposite edge parallel upper edge 72a'. In another embodiment, the point of the equilateral triangle could face upwardly or otherwise. The center of the equilateral triangle is approximately centered in flange 225a, preferably, slightly lower than center. The circles are joined at their points of tangency. All material is removed interior to the circles, as is that exterior material radially inward from the three tangency points toward the center of the equilateral triangle. Trilobe flange hole edge 227a is defined by the convex portions of the three circles running from one tangency point to another, the three portions joined at the tangency points. Preferably, a small amount of material is removed radially at the tangency points, away from the center of the triangle, to avoid creation of very small, to narrow width flange pieces. Preferably, this material is removed about ¼ inch from the point of tangency. Trilobe flange holes 226a is sized to accept, preferably closely, treble tube assembly 230. Trilobe flange 225a is constructed of aluminum plate. Flange hole 226a and cable chases 80a' can be removed by various machining processes for cutting thick metal pieces known to persons of skill in the art, such as a plasma cutter, or a water jet cutter. In this embodiment, trilobe flange 225a has height h4', thickness t4' and width w4', and cable chases 80a have diameter c4'. In a particularly preferred embodiment, flange 225a is constructed of 6061 T6 aluminum, h4' is about 10 inches, t4' is about one inch, w4' is about 23 inches, c4' is about two inches, and d4 is slightly greater than d1, about 4¹⁄₁₆ inches. Trilobe flanges 225b–225k have similar features labeled using those respective suffixes. Flange holes 226a–226k should be aligned to an axis coincident to tube assembly axis 231. In a particularly preferred embodiment, the spacing between the opposing distal and proximal faces of adjacent flanges (e.g. a–b is between distal face 70a' and proximal face 68b') is as follows: a–b through c–d, about 15 inches; d–e, about 9 inches; e–f through j–k, about 23 inches. Trilobe flange 225a will ordinarily be typical, save for the varying position of cable chases 80a'–80k', but need not be.

Turning to FIG. 17C, treble tube assembly 230 includes longitudinal axis 231 and three tubes 232a–232c. In one embodiment, tubes 232a, 232b are lower tubes, having longitudinal axes 234a, 234b parallel to and substantially level with one another. Upper tube 232c has longitudinal axis 234c parallel to axes 234a, 234c, but located between and above them. Other orientations are possible, such as one lower tube and two upper tubes. Tubes 232a, 232b and 232c each have surfaces 233a–233c, proximal ends 236a–236c and distal ends 237a–237c. In a preferred embodiment, tubes 232a–232c are hollow, aluminum cylinders, having circular cross section and having length n11, outer diameter d11 and tube wall thickness t11. In a particular preferred embodiment, d11 is about four inches, t11 is from about ⅜ to about ¼ inch, n11 is about 200 inches and tubes 232a–232c are constructed of 6061 T6 aluminum. As with inner tube 40, a solid rod could be used, but a hollow tube is advantageous. Lower tubes 232a, 232b are side by side, and have surfaces 233a, 233b abutting one another at the tangency point. Directly above lies tube 232c, having surface 233c abutting surfaces 233a, 233c at tangency points on their upper sides. All three tubes 232 have their respective ends 236 and 237 substantially aligned to one another.

The alternative horizontal boom section 20' is constructed similarly to upper boom segment 28, using the techniques described above. The following modifications and substitutions are preferably made to that process. Trilobe flanges 225a–225k, tubes 232a–232c, beams 56' and their constituents are substituted for VBS flanges 134a–134e, tube segments 165a, beam segments 139b and their constituents, respectively. In addition, tubes 232a–232c need not be removed from trilobe flanges 225a–225k during the welding process, as they permit better access to the flanges. Further, after flanges 225 are joined to treble tube assembly 230, each of tubes 225a, 225b and 225c are preferably joined to one another by welding longitudinally along the tangency point between surfaces 233a, 233b and 233c. Such welds are preferably not continuous, but rather are short welds, spaced approximately one foot apart. It may be necessary to invert the structure to accomplish this step for the a–b interface. The sequence in which the flanges are welded to tubes may be varied, such as by beginning at flange 225k, or by welding the tubes together first.

I claim:

1. A boom, having longitudinal and transverse dimensions, comprising:

a first longitudinal member having an external surface;

a second longitudinal member oriented substantially parallel to said first longitudinal member;

said second longitudinal member comprising a plurality of segments, each segment comprising ends;

one or more substantially transverse flanges each having edges and opposing faces and defining at least one hole from one face to the other, wherein the first member extends through the hole;

wherein said first member is internal to said second member, and at least one end of each segment is joined to the face of said one or more flanges, and the external surface is joined to said one or more flanges; and a plurality of third longitudinal members, wherein said third members are joined to the edges of the one or more flanges.

2. A boom having, longitudinal and transverse dimensions comprising:

a first longitudinal member;

a second longitudinal member oriented substantially parallel to said first longitudinal member;

one or more substantially transverse flanges each having edges and opposing faces and defining at least one hole from one face to the other, wherein the first member extends through the hole;

a plurality of third longitudinal members, wherein said third members are joined to the edges of each of the one or more flanges; and said first and second longitudinal members each further comprising an external surface;

wherein said external surfaces are joined to said one or more flanges.

3. A boom having longitudinal and transverse dimensions, comprising:
   a first longitudinal member comprising a tube, wherein said tube is continuous along substantially the length of the boom;
   a second longitudinal member oriented substantially parallel to said first longitudinal member;
   one or more substantially transverse flanges each having edges and opposing faces and defining at least one hole from one face to the other, wherein the first member extends through the hole; and
   a plurality of third longitudinal members, wherein said third members are joined to the edges of each of the one or more flanges.

4. The boom of claim 3, wherein said tube is circular in cross-section.

5. A boom having longitudinal and transverse dimensions, comprising:
   a first longitudinal member;
   a second longitudinal member oriented substantially parallel to said first longitudinal member; said second member comprising a plurality of tubes surrounding said first member and substantially concentric with said first member;
   one or more substantially transverse flanges each having edges and opposing faces and defining at least one hole from one face to the other, wherein the first member extends through the hole; and
   a plurality of third longitudinal members, wherein said third members are joined to the edges of each of the one or more flanges.

6. The boom of claim 5, said first member comprising a tube, and wherein said tube is continuous along substantially the length of the boom.

7. The boom of claim 5, wherein each end of the plurality of tubes is joined to one of said one or more flanges and each of said one or more flanges has one or more sections joined thereto.

8. A boom having longitudinal and transverse dimensions, comprising:
   a first longitudinal member;
   a second longitudinal member oriented substantially parallel to said first longitudinal member;
   one or more substantially transverse flanges each having edges and opposing faces and defining at least one hole from one face to the other, wherein the first member extends through the hole; and
   a plurality of third longitudinal members, wherein said third members are joined to the edges of each of the one or more flanges;
   said third members comprising a substantially planar beam having an inward surface, and one or more legs along the beam's longitudinal length; wherein said one or more legs extends from the inward surface normal to the plane of the beam, and said inward surface is joined to said edges.

9. The boom of claim 8, said flange edges defining a plurality of depressions corresponding congruently to said one or more legs, wherein said depressions facilitate engagement of said beams and said flange edges.

10. A boom having longitudinal and transverse dimensions, comprising:
    a first longitudinal member;
    a second longitudinal member oriented substantially parallel to said first longitudinal member;
    one or more substantially transverse flanges each having edges and opposing faces and defining at least one hole from one face to the other, wherein the first member extends through the hole;
    a plurality of third longitudinal members, wherein said third members are joined to the edges of each of the one or more flanges;
    a proximal end, and;
    an end support;
    wherein the boom is supported at the proximal end by the end support.

11. The boom of claim 10, further comprising a distal end, wherein a large fraction of the load is applied substantially at said distal end, and the boom's longitudinal dimension is in a substantially horizontal plane.

12. The boom of claim 10, further comprising a distal end and secondary structure, wherein said secondary structure is downwardly extending and is supported by the distal end of the boom.

13. A boom having longitudinal and transverse dimensions, comprising:
    a first longitudinal member comprising a continuous tube;
    a second longitudinal member oriented substantially parallel to said first longitudinal member; said second member comprising a plurality of tube segments;
    one or more substantially transverse flanges each having edges and opposing faces and defining at least one hole from one face to the other, wherein the first member extends through the hole; and
    a plurality of third longitudinal members, said third members comprising C-channel beams;
    wherein said third members are joined to the edges of each of the one or more flanges, and wherein said tube segments are outward of and concentric to the continuous tube, and at least one of said tube segments is joined to each of the opposing faces of at least one of said one or more flanges.

14. A boom having longitudinal and transverse dimensions, comprising:
    a first longitudinal member;
    a second longitudinal member oriented substantially parallel to said first longitudinal member;
    one or more substantially transverse flanges each having edges and opposing faces and defining at least one hole from one face to the other, wherein the first member extends through the hole;
    a plurality of third longitudinal members, wherein said third members are joined to the edges of each of the one or more flanges;
    a fourth longitudinal member oriented substantially parallel to said first longitudinal member; and
    said first, second and fourth longitudinal members each comprising a substantially cylindrical tube;
    wherein each of said tubes are adjacent to two other of said tubes and each tube extends through the hole in each of the one or more flanges.

15. The boom of claim 14, wherein the hole in each of the one or more flanges is trilobed in shape, said tubes are joined to said one or more flanges at said hole, and said tubes are continuous along substantially the longitudinal dimension of the structure.

16. A boom having longitudinal and transverse dimensions, comprising:
   a first longitudinal member;
   a second longitudinal member oriented substantially parallel to said first longitudinal member;
   one or more substantially transverse flanges each having edges and opposing faces and defining at least one hole from one face to the other, wherein the first member extends through the hole;
   a plurality of third longitudinal members, wherein said third members are joined to the edges of each of the one or more flanges;
   a distal end; and
   at least one tensioning cable, wherein said cable applies an upward force upon said distal end.

17. The boom of claim 16, further comprising proximal end and a counterweight section, wherein said counterweight section extends substantially longitudinally from the proximal end, said cable is substantially longitudinal, and applies an upward force on said counterweight section.

18. The boom of claim 16, wherein said cable extends substantially longitudinally within the boom.

19. A boom having longitudinal and transverse dimensions, comprising:
   a first longitudinal member;
   a second longitudinal member oriented substantially parallel to said first longitudinal member; said second longitudinal member comprising a plurality of segments, each segment comprising ends;
   one or more substantially transverse flanges each having edges and opposing faces and defining at least one hole from one face to the other, wherein the first member extends through the hole;
   said one or more flanges each having a groove defined in at least one of said faces thereof;
   a plurality of third longitudinal members, wherein said third members are joined to the edges of each of the one or more flanges;
   wherein said first member is internal to said second member, and at least one end of each segment is joined to a face of said one or more flanges, and the external surface is joined to said one or more flanges.

20. The boom of claim 19, wherein said grooves are circular and concentric to the hole in the one or more flanges, and the ends of the segments join the one or more flanges at the grooves.

21. A structure for supporting a load on a chassis comprising:
   a boom, said boom comprising
   a vertical support;
   a first boom section having longitudinal and transverse dimensions, said first boom section comprising:
   proximal and distal ends;
     an inner cylinder having an outer surface, wherein said inner cylinder is circular in cross-section and continuous along substantially the longitudinal extent of the first boom section;
     a plurality of outer tube segments, each comprising two ends, wherein said tube segments are substantially concentrically external of said inner cylinder;
     a plurality of longitudinal beams each comprising a substantially planar inward surface, and one or more legs along the beam's longitudinal extent, wherein said one or more legs extend from the inward surface substantially normal to the plane of the beam; and
     one or more substantially transverse flanges having opposing faces and edges, each flange defining at least one hole from one face to the other face, and defining a plurality of depressions corresponding congruently to said one or more legs, wherein said depressions facilitate engagement of said beams and said flange edges;
     wherein said inner cylinder extends through the hole in the one or more flanges, at least one end of each outer tube segment is joined to the face of said one or more flanges, the external surface is joined to said one or more flanges, and the inward surfaces of said longitudinal beams are joined to the edges of said one or more flanges; and
   a second boom section, said second boom section comprising proximal and distal ends, wherein said second boom section is downwardly extending and is supported by the distal end of the first boom section;
   wherein said vertical section is mounted to the chassis and supports the proximal end of the first boom section.

22. The structure of claim 21, said one or more flanges each defining a circular groove in one or more faces thereof, and the ends of the outer tube segments are inserted into the grooves.

23. The structure of claim 21, wherein both ends of each tube segment are joined to two flanges.

24. The structure of claim 21, said vertical support comprising a mast assembly; wherein said first boom section is rotatable relative to said mast assembly and said first boom section's longitudinal dimension lies in a substantially horizontal plane.

25. The structure of claim 21, wherein said first and second boom sections are comprised of type 6061 T6 aluminum.

26. In a mobile transport, having a longitudinal axis, a support structure for supporting a load at a distance from the transport, the support structure comprising:
   a first support, having upper and lower ends;
   a second support comprising:
     proximal and distal ends;
     a longitudinal support member comprising an external surface;
     a plurality of longitudinal sections;
     a plurality of substantially transverse flanges, each flange defining at least one passage therethrough; and
     a plurality of longitudinal beams;
   wherein said longitudinal support member is internal to said longitudinal sections, the flanges are arrayed in a spaced relationship along said longitudinal support member and are separated from each other by one of the longitudinal sections, the longitudinal support member extends through the passage of each flange, and the external surface, said longitudinal sections, and said longitudinal beams are each joined to said flanges;
   wherein the upper end of said first support is joined to said second support.

27. The support structure of claim 26,
   said longitudinal sections comprising two ends each; and
   said flanges each comprising two outer edges and opposing surfaces through which said passage is defined;

wherein said each end of said longitudinal sections is adjacent to, and joined to, one of the surfaces of one of the flanges, and said beams are joined to said edges of said flanges.

28. The support structure of claim 26, said first support comprising a mast, wherein said mast is oriented along a substantially vertical axis, and translates along that axis, and the second support structure is translated therewith.

29. The support structure of claim 28, said first support further comprising a counterweight structure, wherein said counterweight structure is joined to said second support, and is opposed to said second support.

30. The support structure of claim 28, said first support further comprising a mast-head structure, wherein said mast supports the mast-head structure, and the mast-head structure is joined to the second support.

31. The support structure of claim 28, wherein said second support is rotatable relative to the mast.

32. The support structure of claim 26, further comprising a third support, wherein said second support extends a distance of at least about sixteen feet from the longitudinal axis of the transport, and the distal end of said second support supports the third support.

33. The support structure of claim 26, said second support further comprising at least one tensioning cable, wherein said cable applies an upward force upon said distal end.

34. The support structure of claim 33, said first support further comprising a counterweight section, wherein said cable is substantially longitudinal, and applies an upward force on said counterweight section.

35. The support structure of claim 33, wherein said cable extends substantially longitudinally within the second support.

* * * * *